United States Patent [19]
Thompson

[11] Patent Number: 6,129,549
[45] Date of Patent: Oct. 10, 2000

[54] COMPUTER SYSTEM FOR TRAPSHOOTING COMPETITIONS

[76] Inventor: Clyde H. Thompson, 4602 W. Keim Dr., Glendale, Ariz. 85301

[21] Appl. No.: 08/918,549

[22] Filed: Aug. 22, 1997

[51] Int. Cl.[7] .............................. F41A 33/00; F41G 3/26; G09B 19/00
[52] U.S. Cl. .................................. 434/16; 434/11; 463/2; 273/371
[58] Field of Search ..................... 473/131, 407, 473/409; 700/91, 92, 93; 463/2; 273/371

[56] References Cited

U.S. PATENT DOCUMENTS

| | | | |
|---|---|---|---|
| 4,695,058 | 9/1987 | Carter, III et al. | 463/5 |
| 4,744,761 | 5/1988 | Doerfel et al. | 434/13 |
| 4,948,371 | 8/1990 | Hall | 434/21 |
| 5,083,271 | 1/1992 | Thacher et al. | 364/411 |
| 5,215,464 | 6/1993 | Marshall et al. | 434/22 |
| 5,281,142 | 1/1994 | Zaenglen, Jr. . | |
| 5,320,358 | 6/1994 | Jones | 273/371 |
| 5,562,550 | 10/1996 | Chartrand | 473/131 |
| 5,641,288 | 6/1997 | Zaenglein, Jr. | 434/21 |
| 5,716,216 | 2/1998 | O'Loughlin et al. | 434/22 |
| 5,816,817 | 10/1998 | Tsang et al. | 434/22 |
| 5,823,779 | 10/1998 | Muehle et al. | 434/21 |

Primary Examiner—Joe H. Cheng
Attorney, Agent, or Firm—Martin L. Stoneman

[57] ABSTRACT

A computer system utilizing a local area network and multiple computers used in association with a trapshooting competition of the type wherein each entrant in each event is, at one of multiple squad-assignment stations, assigned to a squad (of particular entrants) scheduled for shooting at a specific time and place. This system's operators, software, and hardware efficiently manage the competition, including computer-assisting assignment of each entrant to a position in a squad. The computer system has a method for temporarily restricting access to an entrant list for a squad of an event to a particular computer workstation, enabling efficient assigning of an additional entrant to a temporarily-restricted entrant list, as well as handling functions like handicapping, scoring, fees, prizes, etc.

20 Claims, 27 Drawing Sheets

Microfiche Appendix Included
(5 Microfiche, 311 Pages)

SET UP MENU

SELECT TOPIC TO BE CONSTRUCTED OR CHANGED

A. TARGETS AND OPTIONS RATE TABLE
B. DAILY FEES
C. FINAL REPORT FORMAT TABLE
D. TITLE OF TOURNAMENT
E. CHANGE MAXIMUM SQUADS PER EVENT
F. MANDATORY HANDICAP / CLASSIFICATION

CHOOSE A, B, C, D, E, OR F THEN PRESS <ENTER>.

F10=DISCONTINUE

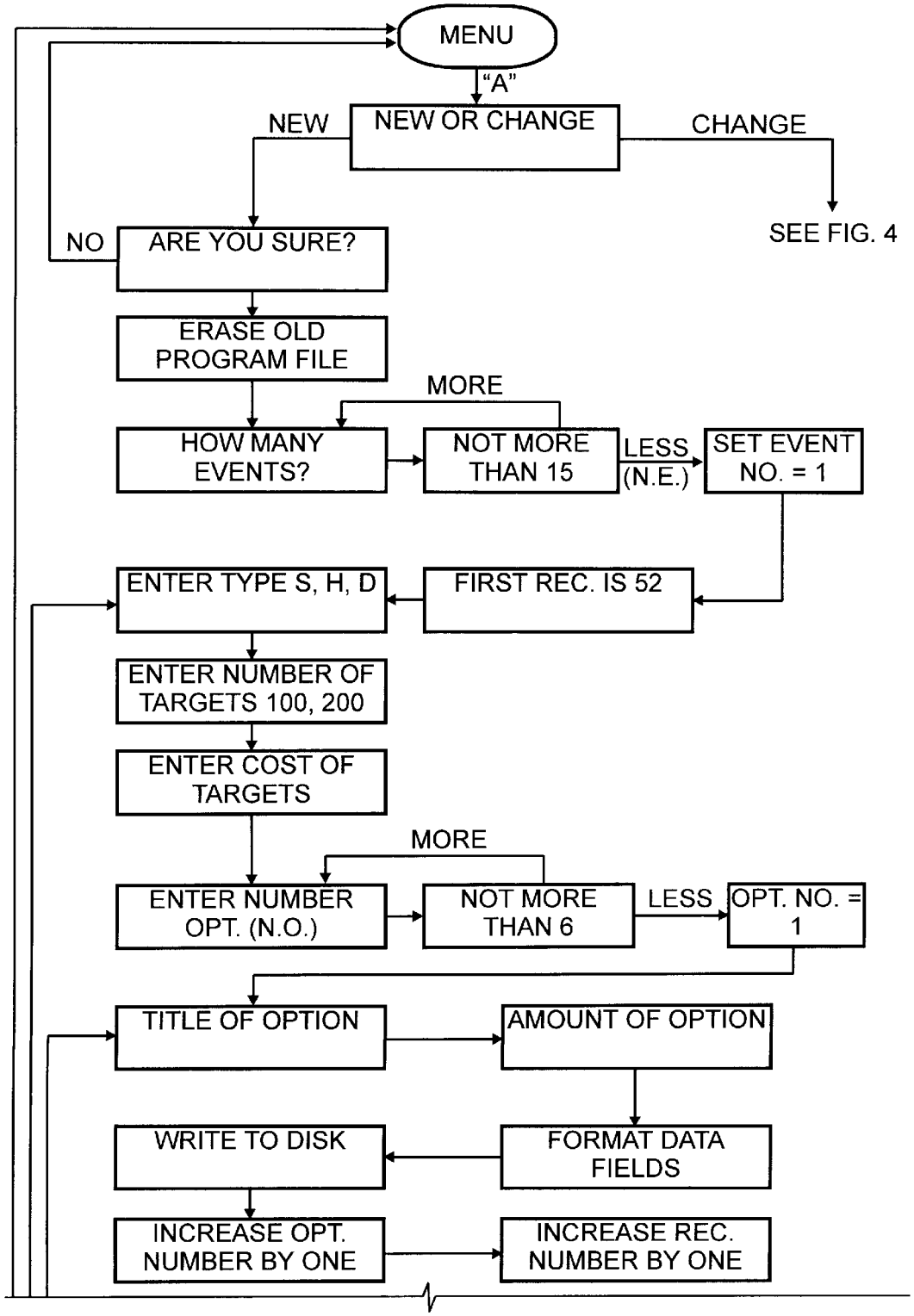
FIG. 3. PAGE 1

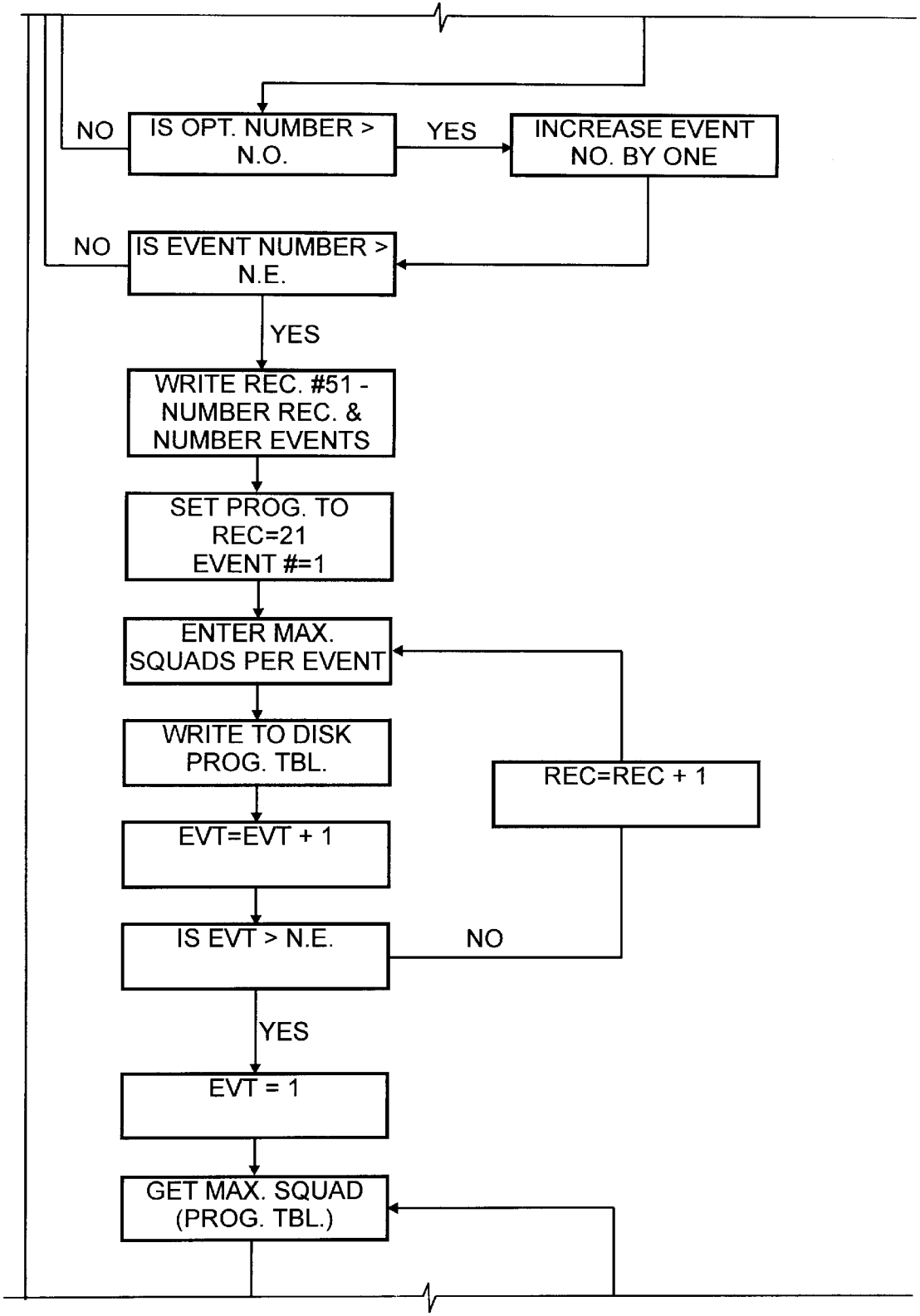
FIG. 3. PAGE 2

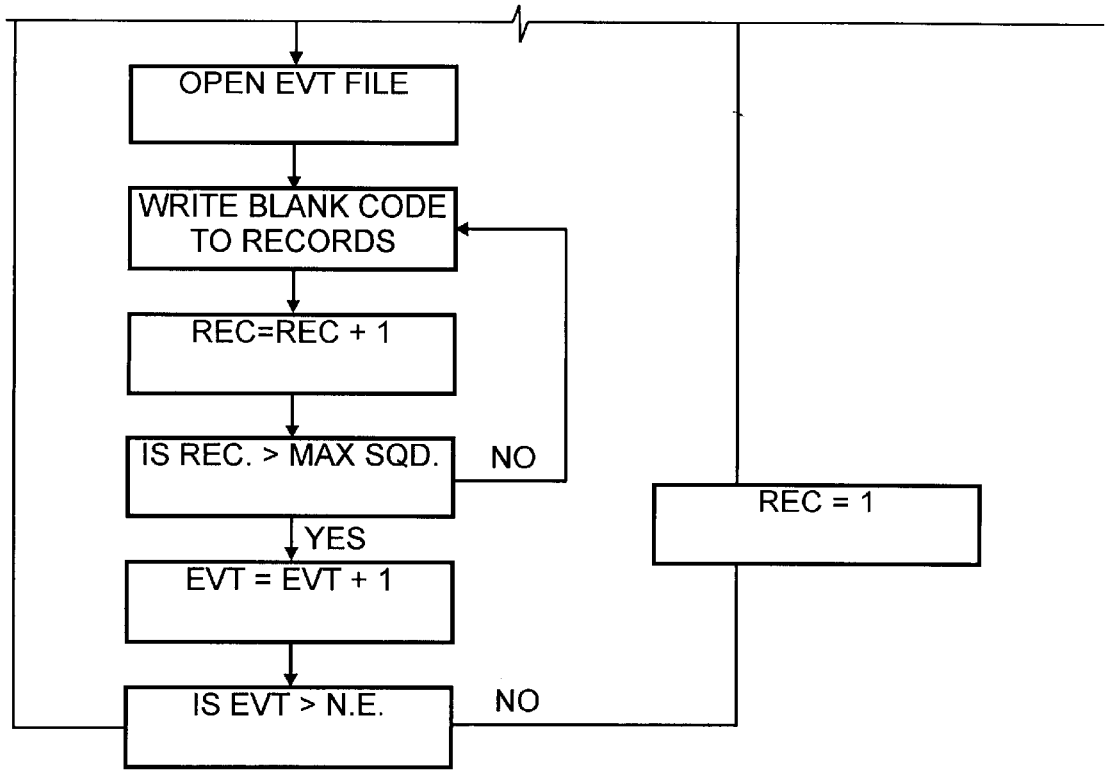
FIG. 3. PAGE 3

FIG. 4. PAGE 1
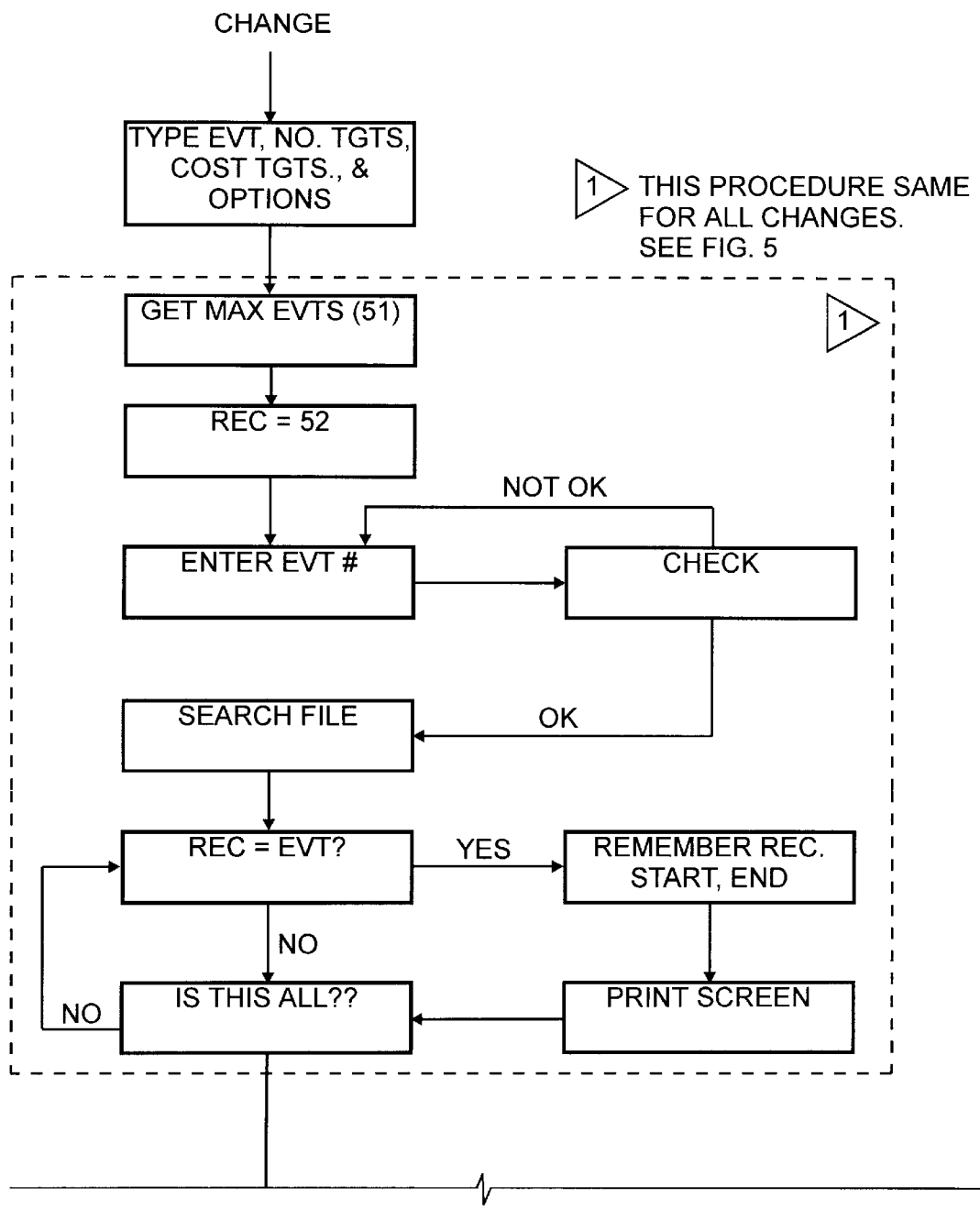

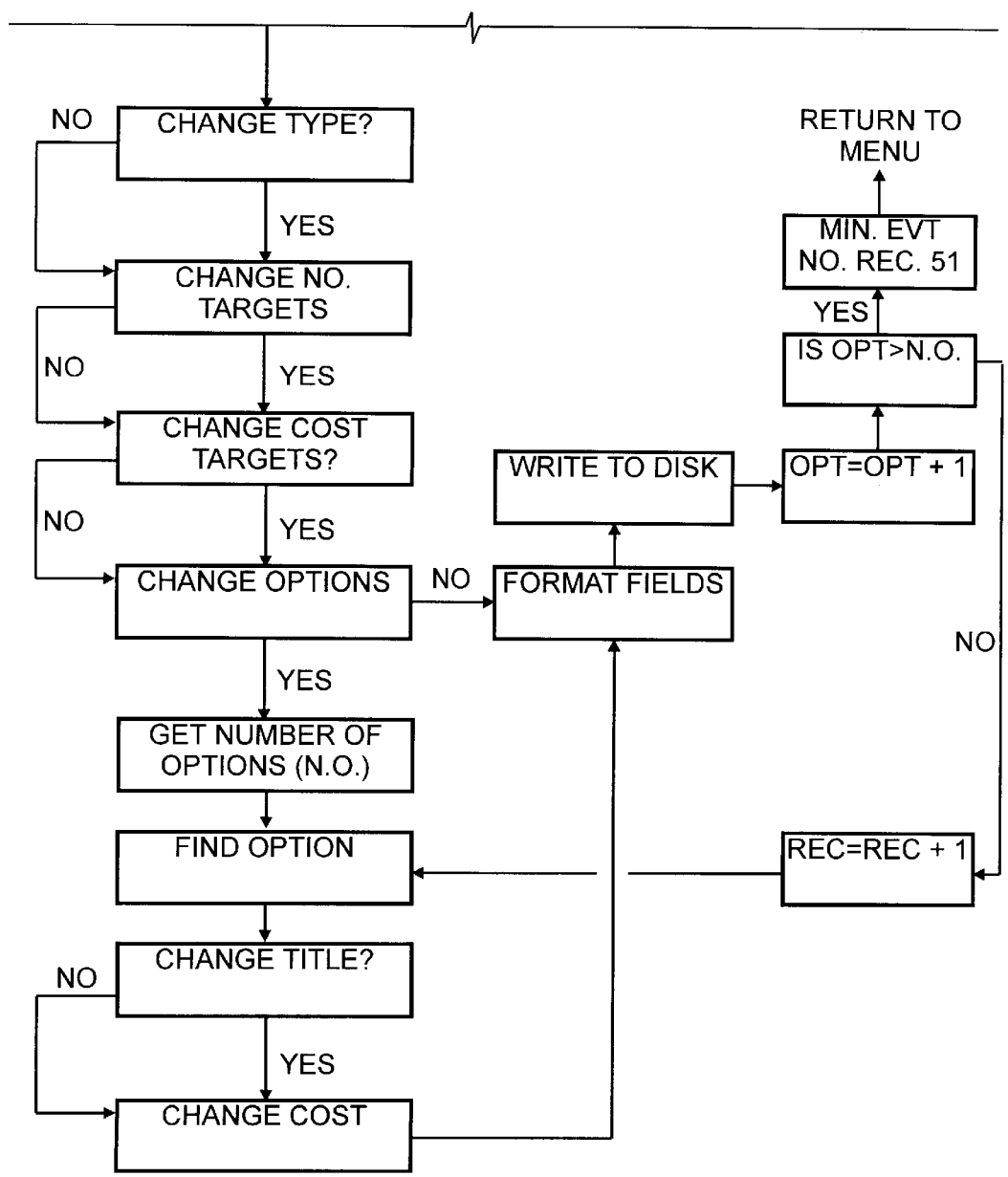
FIG. 4. PAGE 2

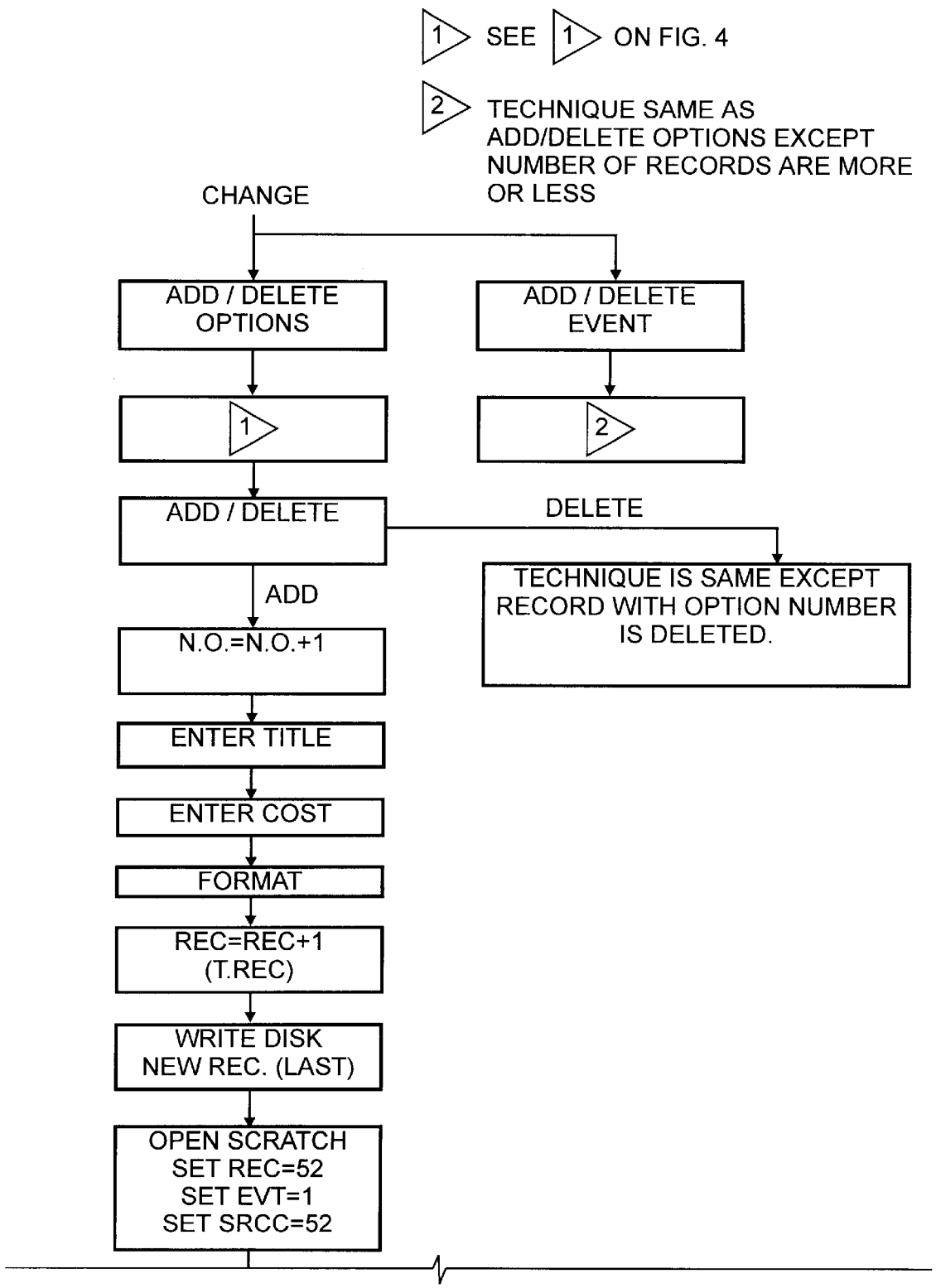
FIG. 5. PAGE 1

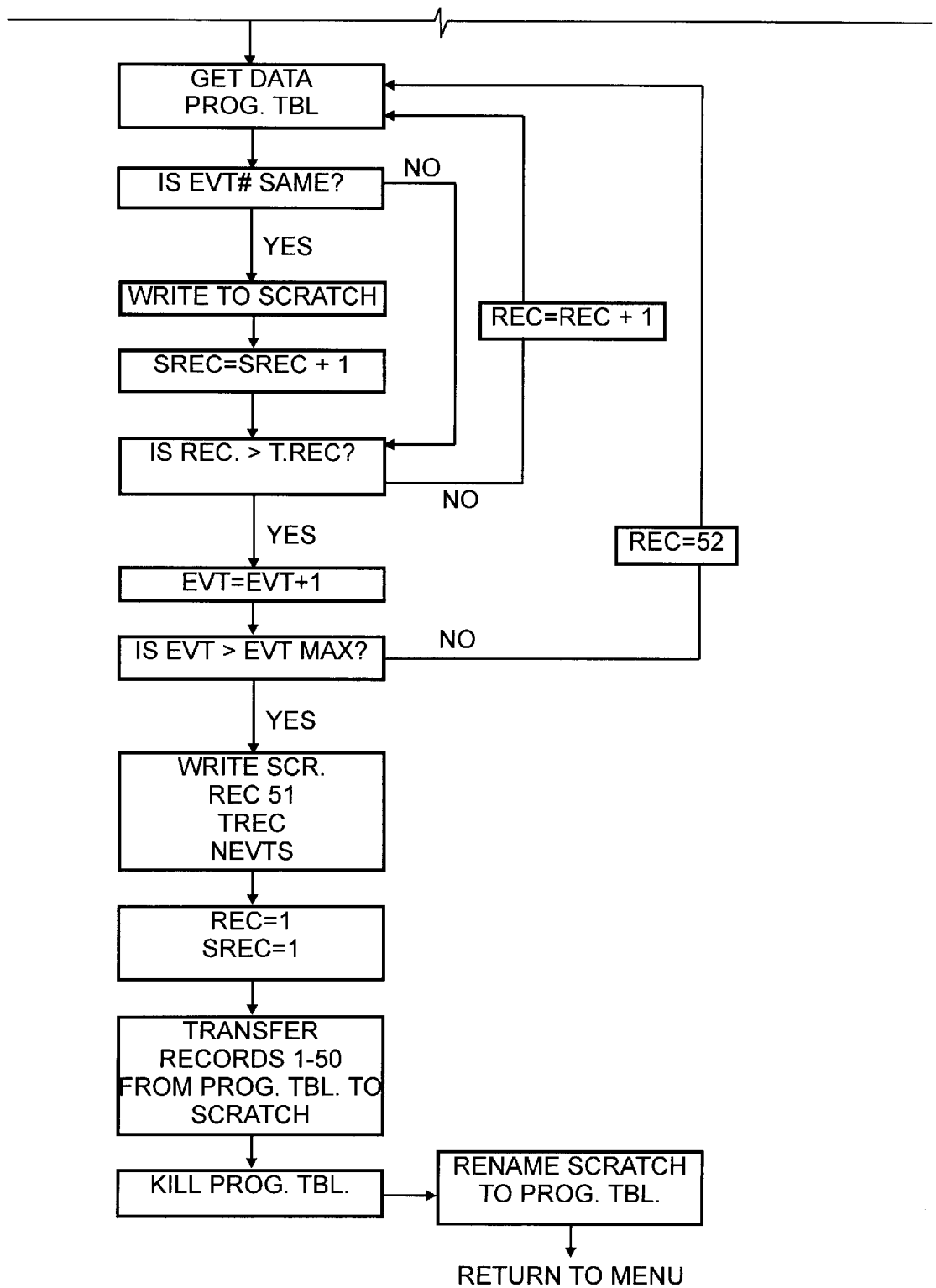
FIG. 5. PAGE 2

FIG. 6

PROGRAM.TBL STRUCTURE

| REC NO. | FUNCTION | FIELD | | |
|---|---|---|---|---|
| 1 | TITLE OF TOURNAMENT | 1-37 | | |
| 2 | MANDATORY CLASS | 16 YD 1-2 | | |
| | | HCP | 3-5 | |
| | | DBLS | 6-7 | |
| | | UNUSED | 8-37 | |
| 6 | NUMBER SHOOTING DAYS | #RECS 2 | 35 UNUSED | |
| 7-20 | NO. DAY, EVTS, TYPE, TGT/DAY | 2,2,2,2 | | |
| 21-50 | MAX NUMB SQUADS/EVENT | 4 | 33 UNUSED | |
| 51 | LAST EVENT NUMBER | 2 | 35 UNUSED | |
| 52-66 | EVENT, OPTIONS DATA | EVT# 1-2 | | |
| | | OPT# 3-4 | | |
| | | TITLE 5-24 | | |
| | | AMTTGT | 25-28 | |
| | | AMTOPT | 29-32 | |
| | | TYP EVT | 33-34 | |
| | | NUM TGT | 35-37 | |

FIG. 7

RECORD LENGTH 128

| | | | |
|---|---|---|---|
| NAME | 1-19 | ATA NUMBER | 20-26 |
| 16YD CLASS | 27-28 | HANDICAP | 29-31 |
| DOUBLES | 32-33 | SPECIAL CLASS | 34-36 |
| SQUAD# | 37-39 | POSITION | 40 |
| FEES | 41 | OPTION 1 | 42 |
| OPTION 2 | 43 | OPTION 3 | 44 |
| OPTION 4 | 45 | OPTION 5 | 46 |
| OPTION 6 | 47 | SCORES | 48-63 |
| RESIDENT FLG | 64 | CASHIER NAME | 65-74 |
| DATE ENTERED | 75-79 | OTHER FEES | 80-83 |
| EVENT NUMBER | 84-85 | TIME ENTERED | 86-90 |
| CHANGE FLAG | 91 | LATE FEE | 92-95 |
| PENALTY FEE | 96-99 | HOW PAID | 100 |
| AMT COLLECTED | 101-104 | CHANGE FEE | 105 |
| CHANGE OPTIONS | 106-111 | CHANGE NAME | 112-121 |
| CHANGE DATE | 122-126 | SPARE | 127-128 |

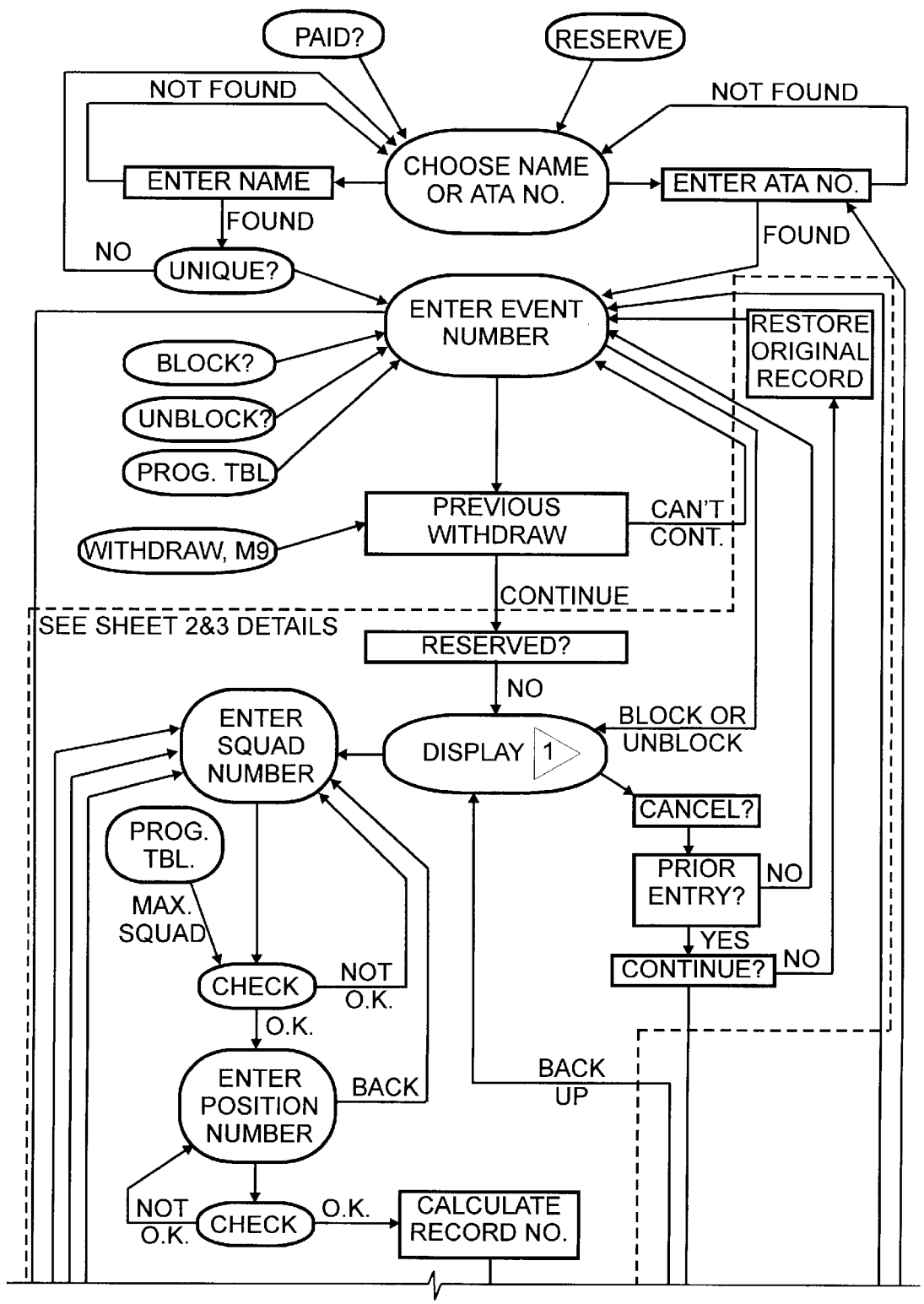
FIG. 8A. PAGE 1

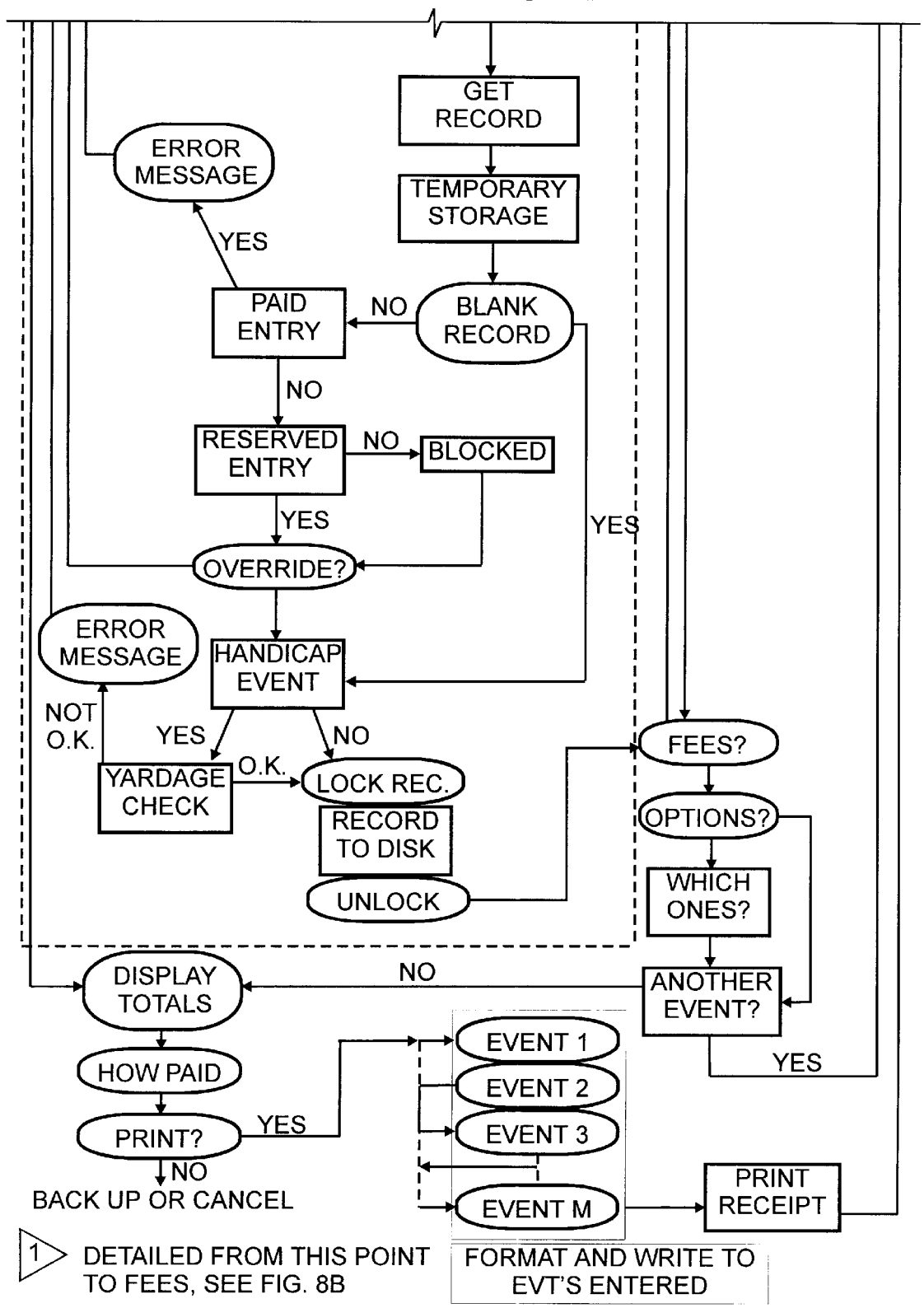
FIG. 8A. PAGE 2

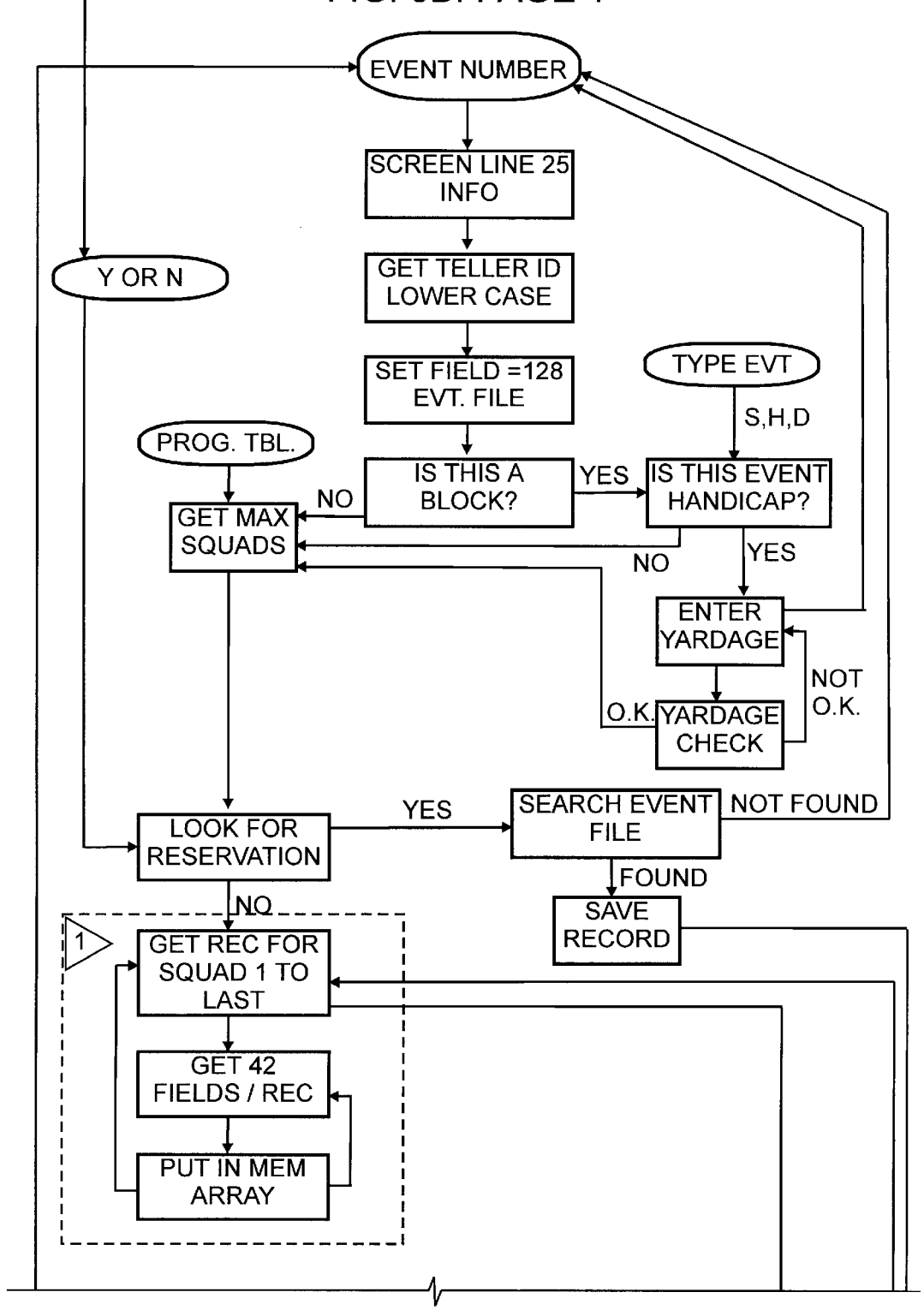
FIG. 8B. PAGE 1

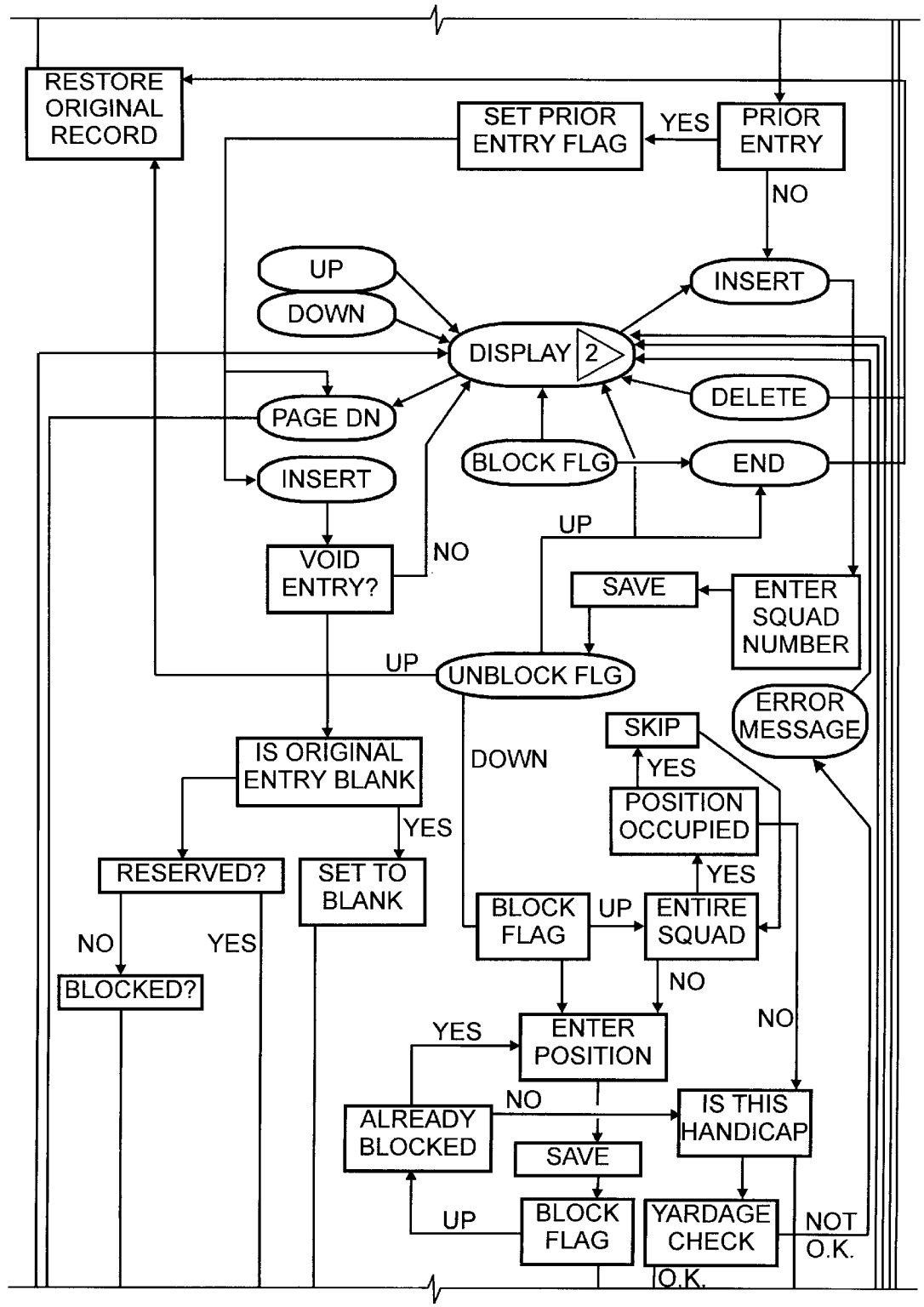
FIG. 8B. PAGE 2

FIG. 10

TRAP SHOOT ENTRY

CHOOSE ONE OF THE FOLLOWING

A.  PAID ENTRY - CHOOSE SQUAD/POSITION/OPTIONS - PAYMENT REQUIRED
B.  RESERVATION - HOLD A SQUAD/POSITION FOR SHOOTER
C.  BLOCK SQUAD/POSITION - BY EVENT AND SQUAD MEMBER
D.  CLEAR BLOCKED SQUAD - BY EVENT AND SQUAD NUMBER

TO SELECT PRESS ONE OF THE LETTERS THEN PRESS <ENTER>

F10=DISCONTINUE

FIG. 11

THIS SHOOTER
LEWIS SANDRA
CLASS: AA  SPEC: L

SOMEONE ELSE

| THIS IS EVENT | EVENT NO. 10 | | | | | NO. OF TGTS 200 | | | | | TYPE EVNT SINGLES | | TARGETS | | |
|---|---|---|---|---|---|---|---|---|---|---|---|---|---|---|---|
| 1 | A | - | AA | A | - | 21 | - | - | (XX) | - | - | 41 | AA A | A | B B |
| 2 | AA | C | B | B | D | 22 | - | - | - | - | - | 42 | - AA | A | A C |
| 3 | - | - | - | - | - | 23 | (FF) | FF | FF | FF | FF | 43 | C B | C | C A |
| 4 | - | - | - | - | - | 24 | - | - | - | - | - | 44 | AA A | A | D B |
| 5 | - | - | - | - | - | 25 | - | B | B | B | B | 45 | C A | AA | A A |
| 6 | - | - | - | - | - | 26 | - | - | - | - | - | 46 | B D | B | D A |
| 7 | GG | - | GG | - | (GG) | 27 | - | C | A | D | B | 47 | AA A | AA | AA C |
| 8 | - | - | - | - | - | 28 | A | C | A | B | D | 48 | B B | D | C A |
| 9 | - | - | - | - | - | 29 | B | C | B | B | C | 49 | A A | B | AA AA |
| 10 | - | AA | C | D | - | 30 | B | A | C | C | - | 50 | A A | B | C C |
| 11 | - | - | - | - | - | 31 | B | C | A | B | - | 51 | C B | C | AA A |
| 12 | - | B | C | C | C | 32 | B | - | B | B | A | 52 | AA AA | B | A B |
| 13 | - | - | C | A | C | 33 | B | D | B | AA | A | 53 | AA A | D | - B |
| 14 | - | - | - | - | - | 34 | C | A | A | A | AA | 54 | C B | C | AA B |
| 15 | AA | A | - | A | - | 35 | AA | B | A | C | D | 55 | A - | B | B A |
| 16 | - | - | - | - | - | 36 | B | C | - | B | A | 56 | C A | A | D A |
| 17 | - | B | - | - | - | 37 | A | A | B | B | B | 57 | A D | B | B (C) |
| 18 | - | - | - | - | - | 38 | D | B | A | B | - | 58 | A A | A | A (A) |
| 19 | - | - | - | - | - | 39 | A | D | B | B | B | 59 | A C | A | A B |
| 20 | C | C | B | C | - | 40 | AA | B | D | B | B | 60 | C A | C | AA B |

CASHIER "G" & "F" BLOCKED SQUADS TYPICAL

SQUAD NUMBERS

POSITIONS 1-5 TYP.
TYP. PAID OR RESERVED

<>=CHANGE SCREEN     <INSERT>=ENTER SQUAD     <DEL>=RTN-EVT

FIG. 12

THIS SHOOTER
WOLF PAUL A
YARDAGE: 24.5    SPEC:

THIS IS EVENT 11    100    HANDICAP  TARGETS

| | | | | | | | | | | | | | | | | |
|---|---|---|---|---|---|---|---|---|---|---|---|---|---|---|---|---|
| 1 | 26 | - | - | 27 | - | 21 | 22 | 21 | 21 | 22 | 21 | 41 | 19 | 20 | 21 | 20 | 20 |
| 2 | 21 | 20 | 20 | 19 | 19 | 22 | - | 21 | 19 | - | 21 | 42 | 21 | 22 | 20 | 20 | 20 |
| 3 | 26 | - | - | - | - | 23 | - | 27 | 25 | 26 | - | 43 | 24 | 24 | - | - | 24 |
| 4 | 27 | - | - | - | - | 24 | 23 | 23 | 23 | 23 | - | 44 | 24 | 24 | - | 23 | 25 |
| 5 | 19 | 20 | 21 | 20 | 20 | 25 | - | - | 26 | 27 | 26 | 45 | 25 | 27 | 25 | 27 | 27 |
| 6 | - | (G0)- | (G0)- | | | 26 | 20 | 21 | - | 20 | 21 | 46 | 21 | 20 | - | - | 20 |
| 7 | - | - | - | - | - | 27 | 23 | 22 | 22 | 21 | 22 | 47 | - | 27 | - | 27 | - |
| 8 | (F4 | F4 | F4 | F4 | F4) | 28 | - | - | (X7) | - | - | 48 | 25 | 25 | 27 | 27 | 27 |
| 9 | - | - | - | - | - | 29 | 27 | - | - | 27 | 27 | 49 | 22 | 24 | 24 | 23 | 23 |
| 10 | 24 | 23 | 22 | 22 | 23 | 30 | 22 | 22 | 23 | - | 23 | 50 | 25 | - | 26 | 26 | 24 |
| 11 | - | - | - | - | - | 31 | 20 | 20 | 21 | 20 | 20 | 51 | 26 | 27 | 27 | 27 | 27 |
| 12 | - | 21 | 21 | - | 23 | 32 | 27 | 26 | 27 | 26 | - | 52 | 27 | - | - | - | - |
| 13 | 20 | 21 | 23 | 21 | 21 | 33 | 23 | - | - | 23 | 23 | 53 | 26 | 27 | 26 | 27 | 27 |
| 14 | - | - | - | - | - | 34 | - | 23 | 25 | 26 | 25 | 54 | 26 | - | 24 | 24 | 24 |
| 15 | 23 | 23 | - | 22 | 22 | 35 | 22 | - | 21 | 23 | 23 | 55 | 22 | 21 | - | 22 | - |
| 16 | - | - | - | - | - | 36 | 25 | 25 | - | 26 | - | 56 | 25 | 26 | 24 | 23 | 25 |
| 17 | - | - | - | - | - | 37 | 20 | 19 | 19 | 19 | 20 | 57 | 24 | 25 | 26 | 25 | 25 |
| 18 | 22 | 23 | 25 | 23 | 23 | 38 | 26 | 27 | 25 | 26 | 25 | 58 | 21 | 20 | 20 | 21 | 20 |
| 19 | 20 | 20 | 21 | - | 20 | 39 | 27 | 26 | 27 | 27 | - | 59 | 21 | 23 | 23 | 22 | 22 |
| 20 | (20) | 20 | 22 | 20 | 19 | 40 | 22 | - | 23 | 23 | 23 | 60 | 27 | 27 | 26 | 26 | 27 |

SQUAD NUMBERS    POSITIONS 1-5 TYP.

<>=CHANGE SCREEN      <INSERT>=ENTER SQUAD    <DEL>=RTN-EVT

BLOCKED BY
CASHIER "F"
24 YARDS

BLOCKED BY
CASHIER "G"
20 YARDS

PAID POSITION
BEING ENTERED 27
YARDS.
ANOTHER SHOOTER
ANOTHER CASHIER

TYPICAL- PAID OR RESERVED
POSITION - 20 YARDS

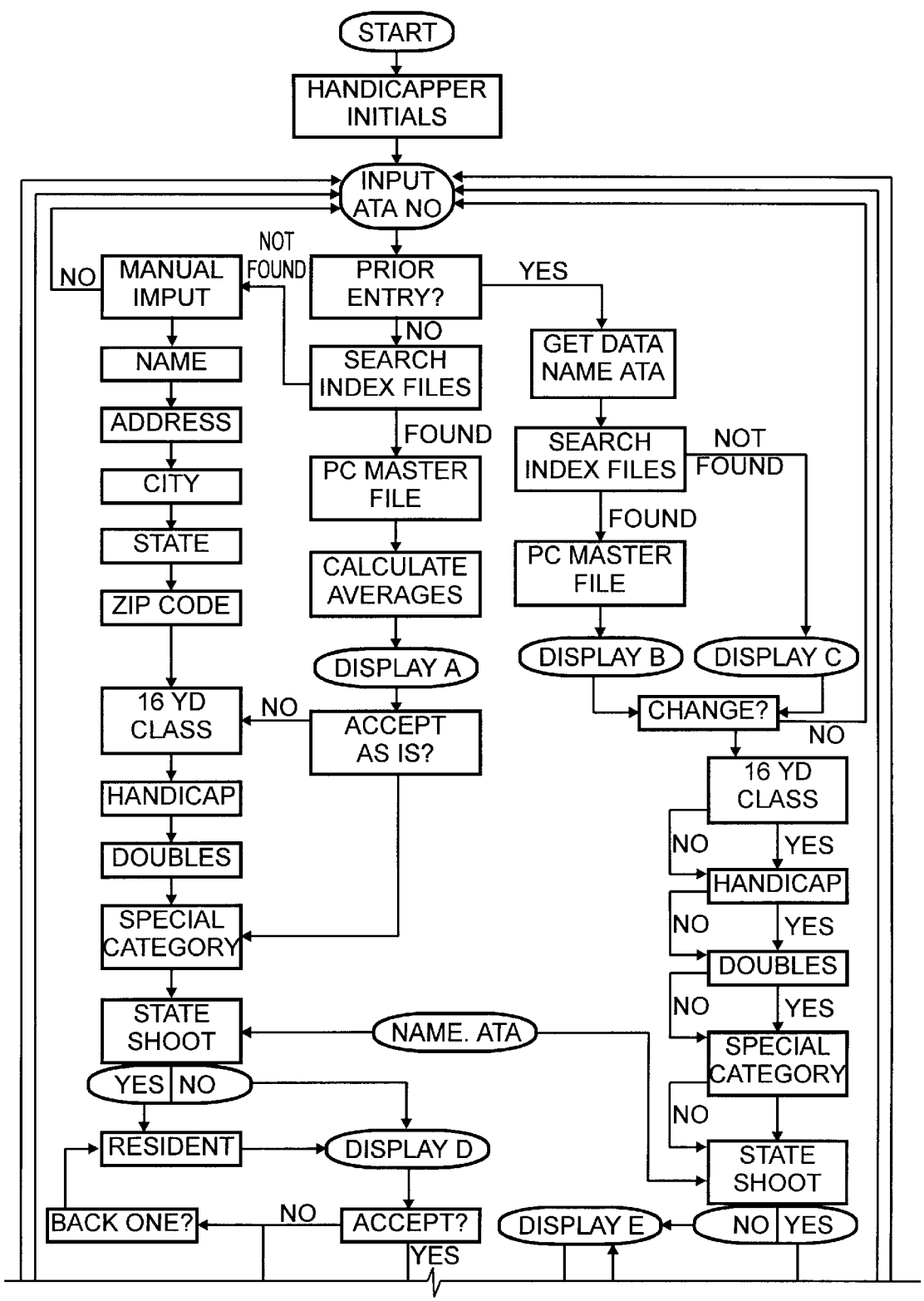
FIG. 15. PAGE 1

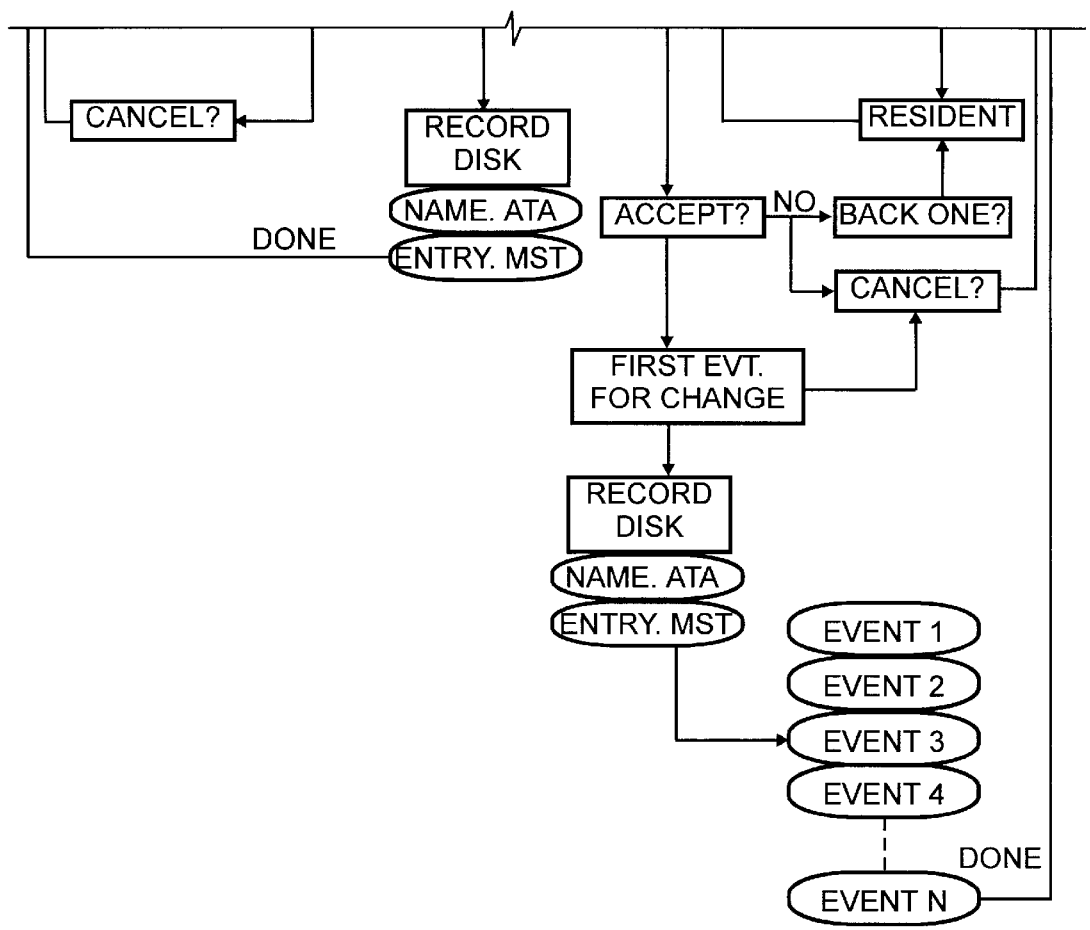
FIG. 15. PAGE 2

FIG. 16

9603221 FRICKE EDWARD A
1807 UNION ST
CLEARWATER  FL  34623

HANDICAP IS 21.5 YARDS

LIFE TARGETS SHOT
16 YARD     8300
HANDICAP    7400
DOUBLES     1500

ANNUAL     PAID

|  | 16 YARD | | | HANDICAP | | | DOUBLES | | |
|---|---|---|---|---|---|---|---|---|---|
| YEAR | SHOT | HIT | Average | SHOT | HIT | AVG | SHOT | HIT | AVG |
| CURRENT | 4700 | 4281 | .911 | 4200 | 3557 | .847 | 1000 | 762 | .762 |
| PREVIOUS 1 | 3600 | 3317 | .921 | 3200 | 2791 | .872 | 500 | 373 | .746 |
| PREVIOUS 2 | 0 | 0 | 0 | 0 | 0 | 0 | 0 | 0 | 0 |
| TOTALS | 8300 | 7598 | .915 | 7400 | 6348 | .858 | 1500 | 1135 | .757 |

BASED ON AVERAGES FOR LAST 3 YEARS THE CLASSIFICATIONS ARE:
   16 YARD : B          HANDICAP: 21.5          DOUBLES:D

IS THE RECOMMENDED ACCEPTABLE?
   <Y> OR <N> THEN <ENTER>

F10=DISCONTINUE

FIG. 17

PCMASTER FILE
FORMAT STRUCTURE IS:     RECORD LENGTH 289

| | | | |
|---|---|---|---|
| 'ATA NUMBER | 1-7 | NAME | 8-27 |
| 'ADDRESS | 28-57 | CITY | 58-77 |
| 'STATE | 78-79 | ZIPCODE | 80-88 |
| 'MISC INTERNATIONAL | 89-91 | HANDICAP | 92-96 |
| 'INTERNAL CODES | 97-102 | LIFE 16 BYD | 103-110 |
| 'REVIEW COUNT | 111-118 | | |
| '16 YD SHOT (2) | 119-124 | 16 YD HIT (2) | 125-130 |
| 'HDCP SHOT (2) | 131-136 | HDCP HIT (2) | 137-142 |
| 'DBLS SHOT (2) | 143-148 | DBLS HIT (2) | 149-154 |
| '16 YD SHOT (1) | 155-160 | 16 YD HIT (1) | 161-166 |
| 'HDCP SHOT (1) | 167-172 | HDCP HIT (1) | 173-178 |
| 'DBLS SHOT (1) | 179-184 | DBLS HIT (1) | 185-190 |
| '16 YD SHOT (C) | 191-196 | 16 YD HIT (C) | 197-202 |
| 'HDCP SHOT (C) | 203-208 | HDCP HIT (C) | 209-214 |
| 'DBLS SHOT (C) | 215-220 | DBLS HIT (C) | 221-226 |
| 'BIRTH DATE | 227-234 | SUSPEND FLAG | 235 |
| 'LIFE HDCP | 236-243 | LIFE DBLS | 244-251 |
| '16 YD GRAND(S) | 252-257 | 16 YD GRAND(H) | 258-263 |
| 'HDCP GRAND(S) | 264-269 | HDCP GRAND(H) | 270-275 |
| 'DBLS GRAND(S) | 276-281 | DBLS GRAND(H) | 282-287 |
| 'CARRIAGE RETURN/LINE FEED | | | 288-289 |

INDEX. REC FILE
FORMAT STRUCTURE IS:     RECORD LENGTH 6

| | | | |
|---|---|---|---|
| 'RECORD NUMB | 1-4 | 1ST 2 NUM ATA | 5-6 |

INDEX. ATA FILE
FORMAT STRUCTURE IS:     RECORD LENGTH 11

| | | | |
|---|---|---|---|
| 'RECORD NUMB | 1-4 | ATA NUMBER | 5-11 |

NAME. ATA FILE
FORMAT STRUCTURE IS:     RECORD LENGTH 45

| | | | |
|---|---|---|---|
| 'NAME | 1-19 | ATA NUMBER | 20-26 |
| '16-YD CLASS | 27-28 | HANDICAP | 29-31 |
| 'DOUBLES CLASS | 32-33 | SPECIAL CLASS | 34-36 |
| 'DAY OF MONTH | 37-38 | STATE SHT TAG | 39(40) |
| 'TIME (HH:MM) | 41-45 | | |

ENTRY.MST FILE
FORMAT STRUCTURE IS:     RECORD LENGTH 144

| | | | |
|---|---|---|---|
| 'NAME | 1-19 | ATA NUMBER | 20-26 |
| '16-YD START | 27-28 | 16 YD CURRENT | 29-30 |
| 'HDCP CURRENT | 31-33 | DBLS CURRENT | 34-35 |
| 'HDCP START | 36-38 | SPCL CLASS | 39-41 |
| 'STREET ADDR | 42-71 | CITY | 72-101 |
| 'STATE | 102-103 | ZIPCODE | 104-113 |
| 'DATE | 114-123 | HANDICAPPER | 124-126 |
| 'STATE SHT TAG | 127 | SPARE | 128 |
| 'TIME | 129-136 | SPARE | 137-144 |

FIG. 18

0409148 WOLF PAUL A                                                                                   LIFE        PAID
HANDICAP IS 23.5 YARDS

|  | 16 YARD | | | HANDICAP | | | DOUBLES | | |
|---|---|---|---|---|---|---|---|---|---|
| YEAR | SHOT | HIT | Average | SHOT | HIT | AVG | SHOT | HIT | AVG |
| CURRENT | 1000 | 945 | .945 | 1200 | 1008 | .84 | 1000 | 878 | .878 |
| PREVIOUS 1 | 4400 | 4136 | .94 | 2900 | 2433 | .839 | 3000 | 2689 | .896 |
| PREVIOUS 2 | 7600 | 7184 | .945 | 1800 | 1556 | .864 | 3000 | 2581 | .86 |
| TOTALS | 13000 | 12265 | .943 | 5900 | 4997 | .847 | 7000 | 6148 | .878 |

---

BASED ON AVERAGES FOR LAST 3 YEARS THE CLASSIFICATIONS ARE:
        16 YARD : A          HANDICAP: 23.5          DOUBLES:B

**************************************************************************************

WOLF PAUL A     HAS BEEN PREVIOUSLY CLASSIFIED BY PW ON 02-16-1997 14:23:05

|  |  | 16 YARD | | HANDICAP | | | |
|---|---|---|---|---|---|---|---|
| NAME | ATA# | START | CURR | START | CURR | DBLS | SP CLASS |
| WOLF PAUL A | 0409148 | A | A | 24.5 | 24.5 | B | |

**************************************************************************************

TO MAKE CHANGES ENTER <Y> THEN PRESS <ENTER>

FIG. 19

SQUADDING, CASHIERING, RESERVATIONS MENU

CHOOSE ONE OF THE FOLLOWING

A1. CASHIERING & RESERVATIONS - ALL EVENTS
A2. CHANGE CASHIERING ENTRY - FOR AN EVENT
A3. CHECK RESERVATIONS - ALL EVENTS - READ ONLY
A4. VIEW SQUADS OR FIND SQUAD/PERSON - IN AN EVENT
A5. CANCEL RESERVATION - FOR AN EVENT
A6. CASHIERS CHECKOUT - FOR ALLL EVENTS - CURRENT DATE
A7. RE-PRINT RECEIPT - COPY OF ENTRY - ALL EVENTS
A8. LOOK-UP CLASSIFICATION - OF AN ENTRANT
Q. RETURN TO MAIN MENU

CHOOSE ONE OF THE LETTER/NUMBER COMBINATIONS THEN
PRESS <ENTER>

FIG. 20

COMPUTE OPTIONS

CHOOSE ONE OF THE FOLLOWING

B1. PERCENTAGE SYSTEM - UP TO FOUR PLACES
B2. HIGH GUN SYSTEM - USING STANDARD TABLES
B3. LEWIS PURSE - PERCENTAGE OR HIGH GUN
B4. CALCUTTA - PERCENTAGE OR HIGH GUN
B5. HALL OF FAME - PERCENTAGE OR HIGH GUN
Q. RETURN TO MAIN MENU

CHOOSE ONE OF THE LETTER/NUMBER COMBINATIONS THEN
PRESS <ENTER>

FIG. 21

PRINT MENU

CHOOSE ONE OF THE FOLLOWING

- C1. EVENT - IN SQUAD ORDER
- C2. PAYOUT LIST - ALPHABETICALLY
- C3. CHECKS - ALPHABETICALLY/ADDRESSED
- C4. WINNERS/ADVANCEMENTS - FOR TROPHYS
- C5. HIGH OVERALL/HIGH ALL-AROUND
- C6. ATA/STATE FEES - PAYABLE PER EVENT
- C7. EVENT SUMMARY - TARGETS, FEES, OPTIONS
- C8. CALCUTTA - LIST FOR SCREEN PROJECTION
- C9. CHECK STUB - FOR EACH EVENT
- C10. ATA DATA DISK FILE - FILE ORDER
- C11. WINNERS LISTING - DECENDING SCORES
- C12. MAILING LIST - ALPHABETICAL ORDER
- C13. CARRY OVERS - TIES IN 16 YD AND DOUBLES
- Q. RETURN TO MAIN MENU

CHOOSE ONE OF THE LETTER/NUMBER COMBINATIONS THEN
PRESS <ENTER>

FIG. 22

UTILITY PROGRAMS

CHOOSE ONE OF THE FOLLOWING

- D1. TRANSFER SCORES - FOR ALL EVENTS TO A MASTER FILE
- D2. CORRECTIONS - ALL BUT CASHIERING & CLASSIFICATION
- D3. ATA DISC - COPYS SCORES TO AN ATA FILE FORMAT
- D4. RESTORE CASHIERS INDEX - THE MASTER ENTRY FILE
- D5. YARDAGE CHECK - SELECTABLE HANDICAP EVENTS
- D6. VIEW FINAL SCORES - OF AN ENTYRANTS - ALL EVENTS
- D7. HANDICAP TABLE - EARNED YARDAGE TABLE
- Q. RETURN TO MAIN MENU

CHOOSE ONE OF THE LETTER/NUMBER COMBINATIONS THEN
PRESS <ENTER>

FIG. 23

TRAP SHOOT ENTRY

CHOOSE ONE OF THE FOLLOWING

A. PAID ENTRY - CHOOSE SQUAD/POSITION/OPTIONS - PAYMENT REQUIRED
B. RESERVATION - HOLD A SQUAD/POSITION FOR SHOOTER
C. BLOCK SQUAD/POSITION - BY EVENT AND SQUAD MEMBER
D. CLEAR BLOCKED SQUAD - BY EVENT AND SQUAD NUMBER

TO SELECT PRESS ONE OF THE LETTERS THEN PRESS <ENTER>

FIG. 24

COMPUTRAP MENU

CHOOSE ONE OF THE FOLLOWING

N. NORMAL - ACCESS TO ALL MENUS
H. HANDICAP - INITIAL ENTRY AND CHANGES
P. PRE-SQUADDING - PRE-SQUADDING PROGRAMS MENU
S. SQUADDING - CASHIERS/SQUADDING PROGAMS MENU
I. INPUT SCORES - FOR AN EVENT
U. NEW PROGRAM OR ATA TAPE - PURGE AND/OR INDEX
X. EXIT - EXIT CONPUTRAP PROGRAMS

PRESS ONE OF THE LETTER KEYS THEN
PRESS <ENTER>

CAUTION: IF THIS IS A NEW TOURNAMENT OR ATA FILES FOR HANDICAP HAVE BEEN UPDATED FROM A NEW TAPE YOU MUST SELECT 'U'.

FIG. 25

THIS IS EVENT 1  THERE ARE 100 TARGETS.  TYPE EVENT IS SINGLES
TOTAL PAID ENTRYS=232   TOTAL RESERVED=0   TOTAL BLOCKED=0

SELECTION MENU FOR SEARCH

CHOOSE ONE OF THE FOLLOWING

1.    SEARCH BY SQUAD NUMBER

2.    SEARCH BY NAME

3.    DISPLAY ALL SQUADS

SELECT 1, 2, OR 3 THEN PRESS <ENTER>.

F5=NEW EVENT      F10=DISCONTINUE

COMPUTER SYSTEM FOR TRAPSHOOTING COMPETITIONS

BACKGROUND OF THE INVENTION

This application contains Microfiche Appendix consisting of Five (5) slides and 311 frames.

1. Field of the Invention

This invention relates to providing a computer system for trapshooting competitions. More particularly, this invention concerns computer systems, including both means and method, for assisting in the overall management of clay sporting competitions, including trapshooting.

The microfiche appendix filed herewith and incorporated by reference herein shows the source code for software for a preferred embodiment of the present invention; and such incorporation is not intended by applicant to waive or take away applicant's copyright rights in such source code or software.

2. Description of the Prior Art

The sport of clay target shooting has been around for many years. Organized competitive shooting was started years ago as a way of simulating the hunting of game birds after the close of the hunting season. From this basic concept, the sport has grown to many variations of the original idea of tossing a glass ball into the air and breaking it by shooting it with a shotgun. The largest organization which presently oversees the rules and regulations of tournament trap shooting is the Amateur Trapshooting Association (ATA) located in Vandalia, Ohio. This organization is worldwide, but principally sanctions tournaments in the United States and Canada. There are other similar clay sporting games, such as Skeet, Sporting Clays, International Trapshooting, etc.

Basically, the modern game of trapshooting utilizes a target made of a mixture of clay and tar, four inches in diameter, that is tossed, upon command of the contestant (shooter), from a machine (called a TRAP) located in a bunker house (TRAPHOUSE) in a safe direction away from the shooter. The objective of the shooter is to break the clay target by shooting it with a shotgun. The nature of the game requires that safety be paramount. Therefore, a well-defined method of shooting, scoring and processing of large numbers of contestants is imperative. Only a maximum of five shooters (called a SQUAD) at any one time are allowed to participate in the shooting of targets from one trap-traphouse combination (called a FIELD). They must shoot singly, i.e. one at a time in turn.

The number of contestants in a tournament determines the number of fields utilized. There are three variations of the sport. These are called: 1) Sixteen Yard or Singles; 2) Handicap; and 3) Doubles. An ATA tournament consists of one or more of these variations. Each such variation is called an EVENT and generally consists of each entrant shooting at 100 or more targets. Typically there are from three to fifteen EVENTS comprising a tournament. Each event (having 100 or more targets) is generally shot in groups of 25 or 50 targets per shooter per field. As the names suggest, in the singles variation, one target at a time is thrown in the air with the shooter standing a distance of 16 yards from the traphouse. In the handicap variation, one target at a time is thrown in the air with the shooter standing at a distance varying from 19 yards to 27 yards from the traphouse. Handicap is based on the contestant's skill; the more skilled have to shoot from further back. Doubles is shot at 16 yards from the traphouse, but two targets are thrown in the air simultaneously with the shooter being required to break both targets with two shots before the target(s) hit the ground.

The game is further organized such that the contestants are competing against others of similar skill levels. The singles and doubles have up to five classifications which are based on the contestant's average scores for breaking targets in each of these games. Further complicating the game is that for each event there are trophies and money awards for many categories. For example, there may be as many as a dozen trophies which may be won by all contestants while only those contestants paying an additional entry fee are eligible to win money.

Trapshooting and like tournaments, by their nature, present a tournament organizer with a lot of variables that cannot be predicted before the day of the tournament. For example, the number of players and thus the number of squads are unknown before the arrival of the players. There are usually long lines of entrants waiting to be assigned to squads and to pay fees, etc. The usual approach is now to use paper-driven systems, with scorecards, records run to each event and back to the scoring table, and so forth. Results may be greatly delayed for the reason of lost records or just an overwhelming amount of records hitting the scoring table at once. A more efficient method, reducing or eliminating paper and speeding up scoring results, etc., is sorely needed.

OBJECTS OF THE INVENTION

A primary object of the present invention is to fulfill the above-mentioned need by the provision of a computer system for assisting in the management of trapshooting tournaments and the like. A further primary object of the present invention is to provide such a computer system which is efficient, inexpensive, and handy. Other objects of this invention will become apparent with reference to the following invention descriptions.

SUMMARY OF THE INVENTION

According to a preferred embodiment of the present invention, this invention provides, in association with a trapshooting competition of the type wherein each entrant in each event is, at one of multiple squad-assignment stations, assigned to a squad (of particular such entrants) scheduled for shooting at a specific time and place, a computer system for assisting assignment of each such entrant to a position in a such squad, comprising: multiple first computer workstations each respectively situate at a such squad-assignment station; a local area network, including a server, connected with each such first computer workstation; computer storage means for storing event data linking each such squad of each such event to an entrant list of such particular entrants; computer software means for temporarily restricting access to a such entrant list for a such squad of a such event to a particular such first computer workstation; and computer software means for assigning, at such particular first computer workstation, an additional entrant to a such temporarily-restricted entrant list. It also provides such a computer system further comprising: computer storage means for storing event handicap data for a large list of potential such entrants to a such trapshooting competition; and computer software means for assigning to each such entrant for each such event an event handicap from such handicap data.

Furthermore, this invention provides such a computer system further comprising: a second computer workstation, connected to such local area network, situate at a handicap-assignment station; and computer software means for assigning, at such second computer workstation, to each such entrant for each such event an event handicap from such handicap data. And it provides such a computer system further comprising: computer storage means for storing fee payment data of fees paid by each such entrant for each such event; and computer software means for assigning to each such entrant for each such event such fee payment data; and, further, further comprising computer storage means for storing scoring data for each such entrant for each such event, and computer software means for assigning to each such entrant for each such event such scoring data; and, further, computer software means for providing scoreboard-type information to a scoreboard; and, further, computer software means for computing prize allocations among contestants in said trapshooting competition. Also, it provides such a computer system further comprising computer software means for restoring such access to such entrant list for such squad of such event to any such first computer workstation.

Moreover, the present invention provides such a computer system further comprising computer storage means for storing an event data record for each such position of each such squad, each such event data record comprising fields for holding shooting data relevant to such event of such trapshooting competition; each such event data record being ordered according to successively numbered positions on successively numbered squads; and computer software means for providing indexing showing the location of each such event data record. It also provides such a computer system further comprising: computer storage means for storing an ordered-name data file for showing the such events entered by each such entrant; and computer software means for temporarily restricting data-writing access to such ordered-name data file to a particular such first computer workstation until such data-writing is complete, whereby such data file may be efficiently maintained in order. And it provides such a computer system further comprising computer software means for enabling a computer operator at a such first computer workstation to back up one screen at a time for efficient error correction.

In addition, according to a preferred embodiment of the present invention, this invention provides, in association with, a trapshooting competition of the type wherein each entrant in each event is, at one of multiple squad-assignment stations, assigned to a squad (of particular such entrants) scheduled for shooting at a specific time and place, a computer system for assisting assignment of each such entrant to a position in a such squad, comprising the steps of: for each such event, using a computer, making a set of event records for storing event data for each such position of each such squad, each such event data record comprising fields for holding shooting data relevant to such event of such trapshooting competition, each such event data record being ordered according to successively numbered positions on successively numbered squads; using one of a set of first computer workstations connected to a server in a local area network, temporarily restricting access to such event records for a particular such squad of a such event to a particular such first computer workstation; and using such particular first computer workstation, assigning an additional entrant to such temporarily-restricted squad event records. And it provides such a computer system further comprising the steps of: storing in such computer system event handicap data for a large list of potential such entrants to a such trapshooting competition; and computing in such computer system and assigning to each such entrant for each such event an event handicap from such handicap data.

Additionally, this invention provides such a computer system further comprising the step of using such particular first computer workstation, unblocking free access to such temporarily-restricted squad event records, whereby each such first computer workstation may access such temporarily-restricted squad event records; and, further, the step of, using such particular first computer workstation, computing a fee due from an entrant and issuing a receipt for such fee due; and, further, the step of writing to such event records scoring data for each such entrant to such event; and, further, the step of providing to a monitor of a second computer workstation scoring information in the form of a scoreboard-leaderboard.

Even further, in accordance with a preferred embodiment thereof, this invention provides, in a computer system of the type wherein multiple computer workstations are linked in a local area network, and for use in association with a clay sporting competition of the type wherein each entrant in each event is assigned to a position on a squad (of particular such entrants), computer means for assisting the running of such clay sporting competition comprising: computer software means for making, for each such event, a set of event records for storing event data for each such position of each such squad, each such event record comprising fields for holding shooting data relevant to such event of such clay sporting competition; computer storage means for storing such set of event records; and computer software means for reading data from and writing data to such event records, including scoring data for each such entrant in each such event. And it provides such a computer system further comprising: computer software means for computing a handicap for a such entrant from data supplied for potential entrants by a large organization overseeing rules and regulations of such clay sporting competition; and computer software means for providing a storage record, for such large organization overseeing rules and regulations of such clay sporting competition, of final data from such clay sporting competition. And it also provides such a computer system further comprising: computer software means for temporarily restricting access to such event records for a particular such squad of a such event to a particular such computer workstation; and computer software means for assigning, at such particular computer workstation, an additional entrant to such temporarily-restricted squad event records.

BRIEF DESCRIPTION OF THE DRAWINGS

FIG. 3 is a Program flow chart for the Setup program for a New Tournament.

FIG. 4 is a Program flow chart for the Setup program for Changes to Events.

FIG. 5 is a Program flow chart for the Setup program for Add/Delete Options or Events.

FIG. 6 illustrates the PROGRAM.TBL field structure/format.

FIG. 7 illustrates the EVENT## field structure/format.

FIGS. 8A and 8B illustrate a Program flow chart for the Squadding/Cashiering program.

FIG. 10 illustrates a preferred Cashiering/Squadding Main Menu.

FIG. 11 illustrates a typical Cashiering/Squadding entry screen.

FIG. 12 illustrates a typical Cashiering/Squadding Handicap screen.

FIG. 15 is a Program flow chart for the Handicap program according to the preferred embodiment of the computer system of the present invention.

FIG. 16 illustrates a typical "No Prior Entry" screen.

FIG. 17 illustrates a preferred Field structure for Handicap files.

FIG. 18 illustrates a typical "Prior Entry" handicap screen.

FIG. 19 illustrates a preferred Squadding, Cashiering, and Reservations Menu.

FIG. 20 illustrates a preferred Compute Options Menu.

FIG. 21 illustrates a preferred Print Menu.

FIG. 22 illustrates a preferred Utility Menu.

FIG. 23 illustrates a preferred Trap Shoot Entry Menu.

FIG. 24 illustrates a preferred Main Menu.

FIG. 25 illustrates a preferred Search Selection Menu.

DETAILED DESCRIPTION OF A PREFERRED EMBODIMENT AND THE BEST MODE OF PRACTICE

Figures 1, 2:
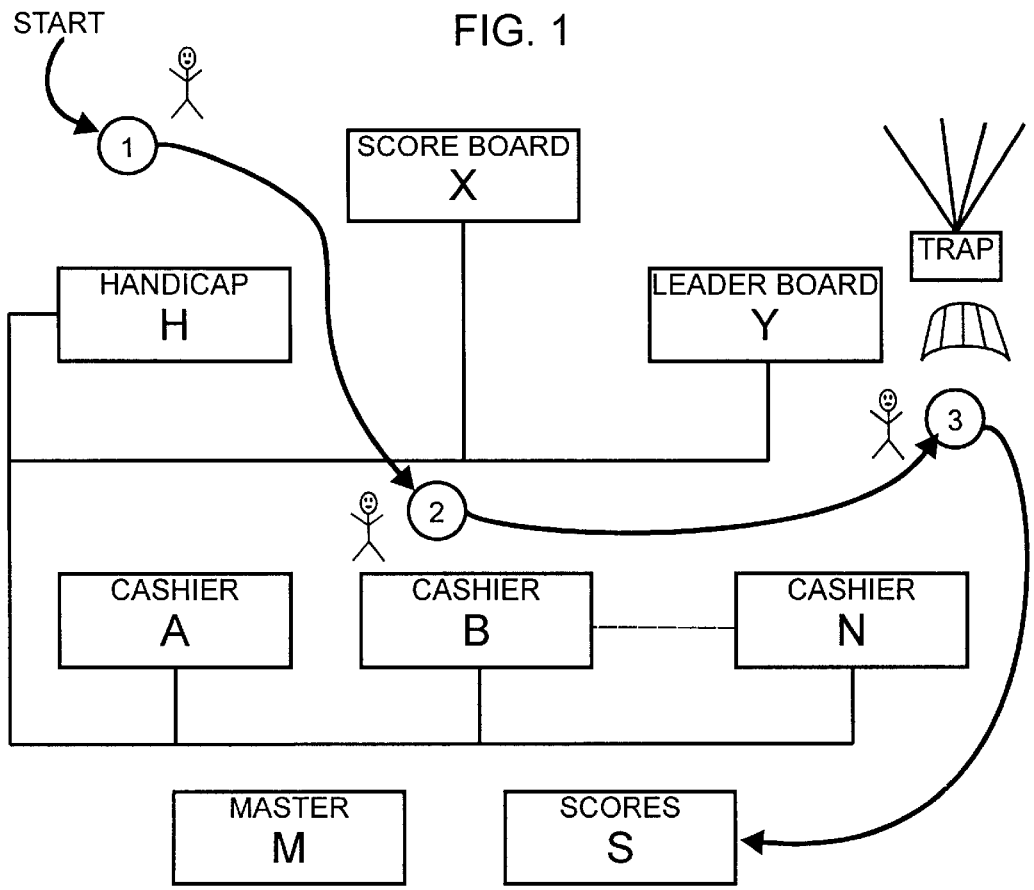
FIG. 1 is a diagram of a typical network configuration, according to a preferred embodiment of the computer system of the present invention, for a typical trapshooting competition.
FIG. 2 illustrates a preferred Setup Menu according to the illustrated preferred embodiment.

This invention, according to a preferred embodiment thereof, is intended for use in association with a trapshooting competition of the type wherein each entrant in each event is, at one of multiple squad-assignment stations, assigned to a squad (of particular such entrants) scheduled for shooting at a specific time and place. This invention provides a computer system for assisting assignment of each such entrant to a position in a such squad, as well as handling the other management duties of the competition in an efficient manner.

This invention provides very many advantages not obtained at present. It automates an otherwise tedious paper record-keeping system for trapshooting tournaments, using a computer program written in BASIC. (While the BASIC computer programming language is the best mode of this system at present, due to the changing nature of technology, it may be that JAVA or some other language will be the preferred language in the near future; the system of this invention can use any programming language.) This invention eliminates most of the use of paper in managing a tournament. It provides faster results, faster setup and running of a trapshooting tournament, and greater accuracy in tournament results. It uses any computer network system with low end computers or even dumb terminals, and efficiently uses a master database for handicapping. It does not require entry cards. Squadding and cashiering can be simultaneous or independent. It allows up to 2000 entries, 300 squads per event, 15 events. Electronic score boards display scores and leaders in real time, with fast and efficient computation of winners and options money (prizes). And final scores are placable on a floppy disk for reporting to the trapshooting authority organization, the Amateurs Trapshooting Association ("ATA"). The claimed system is sometimes referred to in this description as "COMPUTRAP".

This system requires that the tournament organizer have a Local Area Network ("LAN") controlled by network software. The type of network software and configuration hardware (i.e. connectors, cable size and type, network cards) is unimportant as the system program operates under any type of network software or configuration hardware. Obviously, the better the LAN hardware and software, the faster the program will operate, but the LAN hardware and software does not affect the functioning of the program itself. Suggested computer hardware minimums should be:

1. LAN server with a chip of 386 or higher with a clock speed greater than 33 MHz (the newest chip on the market is always the best to use). It must have one 3M inch floppy drive, at least 2 MB of RAM, a hard drive of at least 60 MB, Colorado minicartridge tape drive, a monitor (color or monochrome) and a dot matrix printer or better. The network card must be at least a NE 2000 equivalent or better. The LAN server, or master computer ("server"), holds the COMPUTRAP software programs and data files.

2. The workstations ("workstations") require a computer chip of 386 or higher with a clock speed greater than 33 MHz (the newest chip on the market is always the best to use). It must have one 3% inch floppy drive, at least 2 ME of RAM, a hard drive of at least 20 MB, a monitor (color or monochrome) and a dot matrix printer or better. The network card must be at least a NE 2000 equivalent or better.

3. Note: "Dumb terminals" are not recommended. If all computers are identical, it allows any computer to serve as a backup in case of failure of the LAN server.

4. The workstation can access the COMPUTRAP programs and data files either from the server or from the workstation's own 5-hard drive, depending on the LAN that is used. In theory any task can be performed through any of the computers, but in practice particular computers are assigned certain functional tasks and are only utilized for that assigned task. The best LAN software will limit each station to the software and data files needed for its task, but this is not necessary.

Such LAN servers and workstations embody herein this system's multiple first computer workstations each respectively situate at a such squad-assignment station; and a local area network, including a server, connected with each such first computer workstation. The tasks for the workstations include handicapping, cashiering, scoring, the score board, and the leader board. Each of these tasks can be combined at a station as the tournament organizer desires. Multiple stations are also possible, depending on how the tournament organizer sets up the LAN. With reference generally to FIG. 1, for example, in a typical trapshooting competition, a total of about 18 workstations might be used to advantage: a couple of handicap stations, about 10 cashier/squadding stations, one or two stations to input scoring, and perhaps four to five stations (with monitors for public view) to act as scoreboards and/or leaderboards and/or printout stations. Again, with reference to FIG. 1, in a clay sporting competition with hundreds or thousands of entrants all appearing at about the same time to enter events, pay fees, get handicaps, and be assigned to competition squads to be shooting at various trap locations, there is often mass confusion; and the use of the computer system of this invention (with its multiple workstations) greatly assists in managing the competition efficiently with less "waiting time" and fewer errors.

Any of the workstation computers can access the data files. The user programs can either be called from the server or master computer or from a local hard disk, depending upon the type of network utilized. In theory any task can be performed through any of the computers, but in practice (as illustrated in FIG. 1) certain computers are assigned certain functional tasks and are only utilized for the assigned task. The circled numbers in FIG. 1 illustrate the chronological order of a shooter typical procedures in entering the tournament.

FIG. 2 illustrates the main menu for the setup program. This program must be executed prior to execution of any of COMPUTRAP's functional programs. This program creates a PROGRAM.TBL file that contains all the pertinent information of the trapshooting tournament. (FIG. 6 illustrates the field format of this file.) The setup program also creates the EVENT## files, where ## represents the event number: one EVENT for each event of the tournament. Each event file is a blank, closed file (i.e. the maximum number of records for each event is pre-established by the maximum number of squads assigned to the P-event). The maximum number of records is related to the maximum number of squads by the formula: REC=5(SQUAD NUMBERc1)+POSITION NUMBER+38. The format of the event files, discussed more hereinafter, and embodying in this computer system computer storage means for storing event data linking each such squad of each such event to an entrant list of such particular entrants, is important for the proper operation of the COMPUTRAP cashiering and squadding program. (FIG. 7 illustrates the field format of these files.)

Referring to FIG. 3, choice "A" is followed by a menu that allows a choice for a "NEW PROGRAM" or "CHANGE TO EXISTING PROGRAM". Successful completion of "NEW PROGRAM" will allow most of COMPUTRAP's programs to run. For all programs to be correct, however, choices "B", "D", and "F" are also required. "C" is optional. "C" is required to format a final report in a special format. "E" is selected if one desires to increase the number of squads in an event. (Note: The number of squads in an event cannot be decreased once established.) Choices "B" through "F" are written directly to an individual record in the PROGRAM.TBL file. PROGRAM.TBL and EVENT## are the only two files required to execute the tournament program.

FIG. 3 is a Program flow chart for the Setup program for a New Tournament. FIG. 4 is a Program flow chart for the Setup program for Changes to Events. FIG. 5 is a Program flow chart for the Setup program for Add/Delete Options or Events. To set up a tournament, the computer should be turned on with the server/master-computer online. If the computer system programs goof this invention have been installed properly, computer will automatically load the programs it needs to connect to the network. The network startup programs are independent of the go COMPUTRAP programs. With reference to FIG. 2 again, the user will type COMPUTRAP then press <ENTER>; and the setup menu screen shown in FIG. 2 will come up. The user should, if starting a new tournament, first purge the old files and set up new ones PRIOR TO using COMPUTRAP. The DOS COPY command may be used to save these old files, else they will be lost. A typical command used might be: COPY C:\ENTRYS\*.* [destination] <ENTER>.

To set up a new tournament program the pertinent information from the tournament program must be input to a master program file and appropriate event files. All old program files must be deleted. COMPUTRAP will allow up to 15 tournament events. The user should select 'U1' from the SET UP menu and follow the onscreen instructions. To set up the HANDICAP INDEX FILES 'U2', the ATA data file may be purchased from the ATA office at Vandalia, Ohio. This file is supplied on a DC 2120 minicartridge cassette. The file typically has 90,000 records of the current active ATA members. The name of the file is PCMASTER. The tape is placed in a Colorado tape drive and using the Colorado tape drive software the file is transferred to the master computer. Generally, this software creates its own directory called TRANSFER. Using DOS COPY, the PCMASTER file should be copied from the transfer directory to the ATAFILES directory. A typical command is: COPY C:\TRANSFER\PCMASTER C:\ATAFILES\PCMASTER <ENTER>. Note that is not necessary to have the ATA PCMASTER data file in order to use the HANDICAP program. The classification data required by COMPUTRAP's HANDICAP program can be entered through the keyboard.

To set up the PCMASTER data file for access, it is necessary to create two index files, INDEX.REC and INDEX.ATA. The index files speed the access time to the huge ATA data file records. The user should select 'U2' "HANDICAP INDEX" from the SET UP menu and follow the on-screen instructions. The first step in the entry procedure is the contestant must be assigned a classification and handicap using a computer H (referring once again to FIG. 1). In the most cases, this is obtained by accessing the discussed ATA data bank. Access to the shooters' records is via a unique seven-digit number, which is assigned by the ATA (called the ATA number). If the shooter is not in the data bank, a fictitious seven digit ATA NUMBER is assigned and the appropriate data is entered through the keyboard. This fictitious number is only used at the tournament. Changes to the assigned classification or handicap are made through computer H. The appropriate data is transferred from computer H to a tournament master file on the master computer M. As described hereinafter, the tournament results are supplied to the ATA on floppy disk after the tournament. The details of the preferred Handicap program will be later set forth with reference to FIG. 15. This embodies in the present invention computer software means for computing a handicap for a such entrant from data supplied for potential entrants by a large organization overseeing rules and regulations of such clay sporting competition; and computer software means for providing a storage record, for such large organization overseeing rules and regulations of such clay sporting competition, of final data from such clay sporting competition.

Upon completion of the classification/handicap process, the shooter may elect to enter one or more events. This is done at any one of the computer stations marked on FIG. 1 as A, B, through n. Using the shooter's ATA NUMBER or NAME, any of these stations can call from the master computer M the shooter's classification data.

Figure 9:
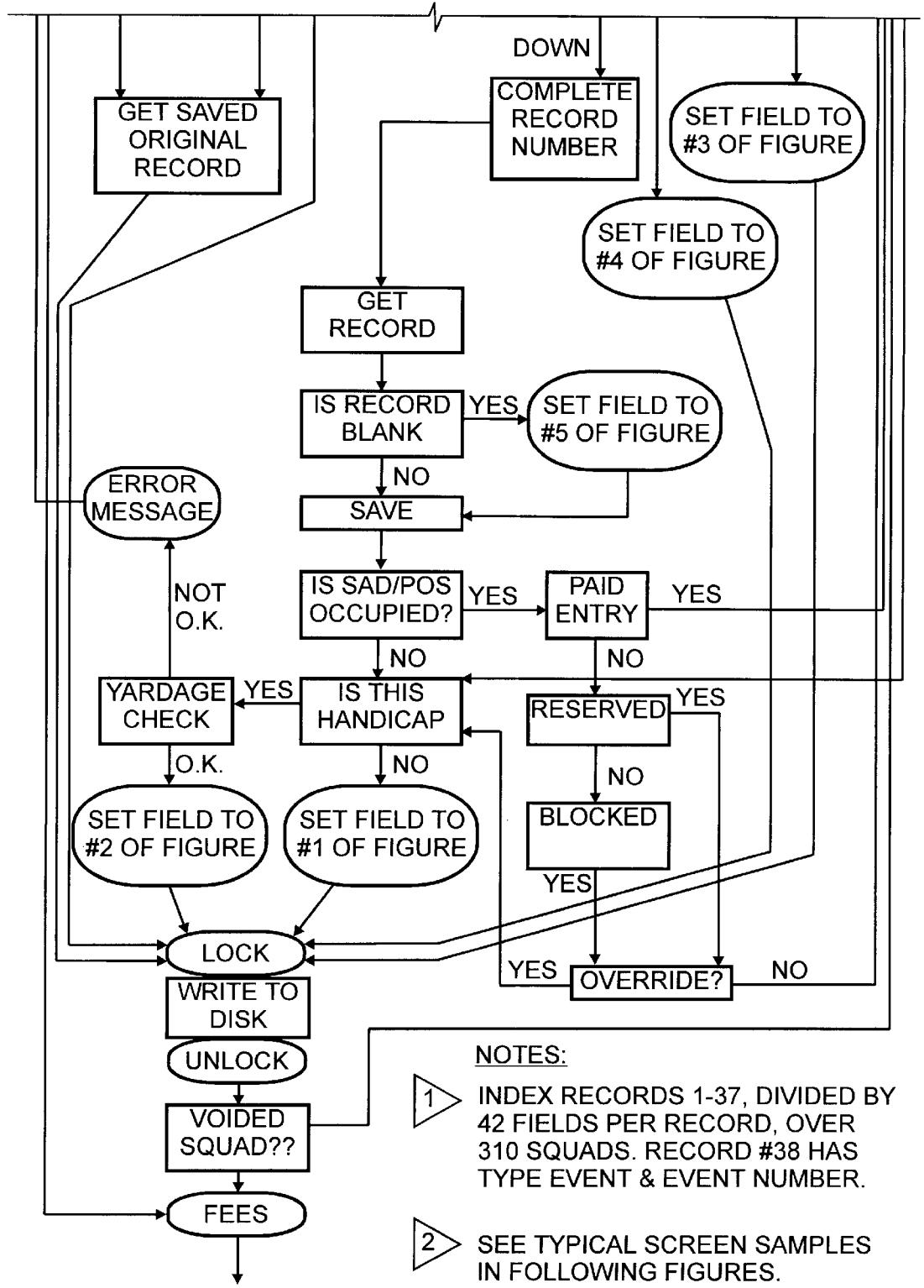
FIG. 9 is a Program flow chart for the Squadding/Cashiering program illustrating the Find Squad Display.
Figure 13:
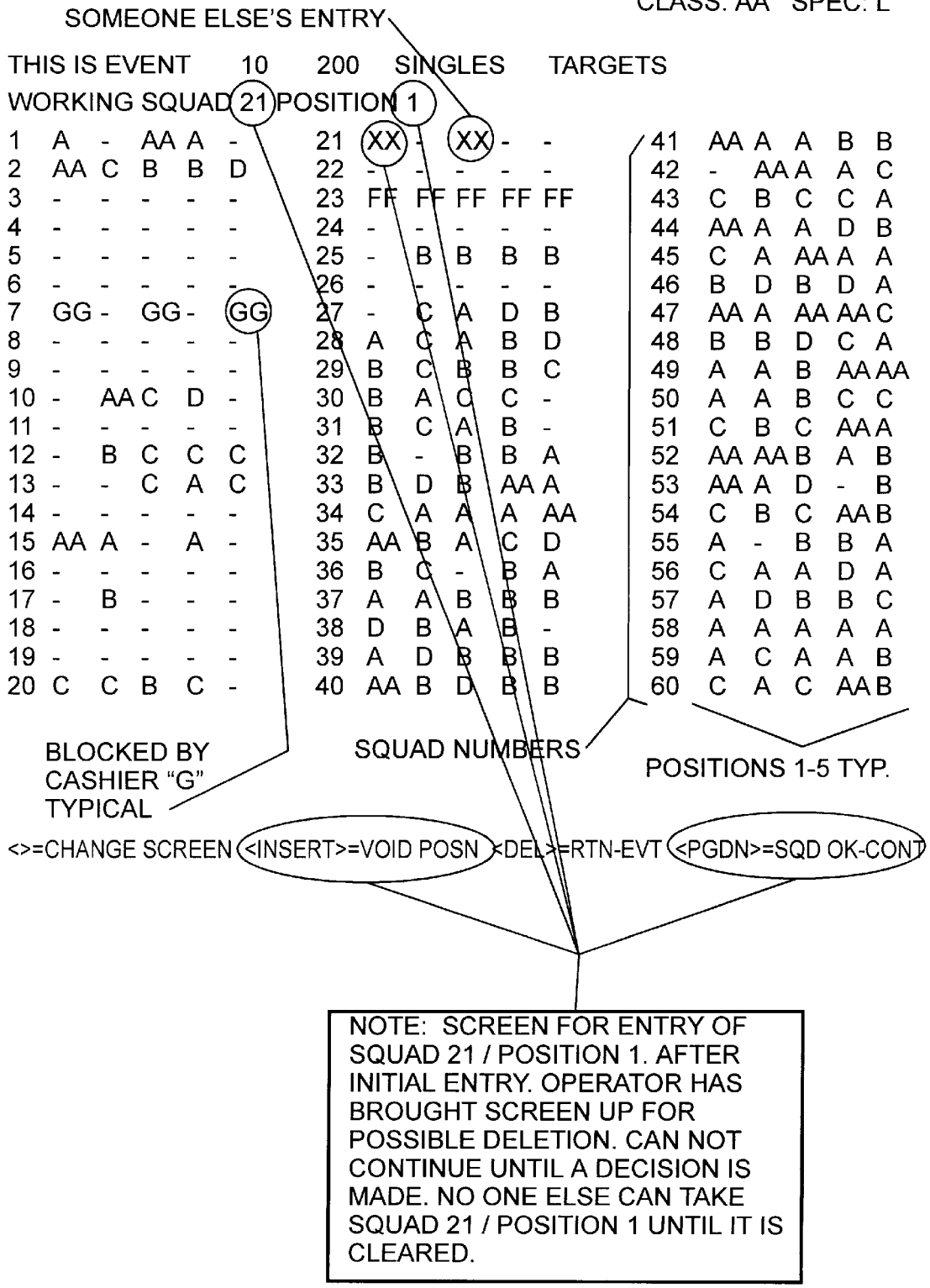
FIG. 13 illustrates a typical Cashiering/Squadding screen for Sixteen Yard or Doubles illustrating the ability to void an entry.

FIGS. 8A and 8B illustrate a Program flow chart for the Squadding/Cashiering program. FIG. 9 is a Program flow chart for the Squadding/Cashiering program illustrating the Find Squad Display. FIG. 10 illustrates a preferred Cashiering/Squadding Main Menu. FIG. 11 illustrates a typical Cashiering/Squadding entry screen. FIG. 12 illustrates a typical Cashiering/Squadding Handicap screen. FIG. 13 illustrates a typical Cashiering/Squadding screen for Sixteen Yard or Doubles illustrating the ability to void an entry. It is important to note that ALL cashier's stations have access to ALL files on the master computer. The only exception is that a local TELLER file is created for each cashier's station. The TELLER file is created at boot up of the cashiers station and contains the cashier's name and a window identification letter. The program files required from the master computer are: PROGRAM.TBL; NAME.ATA; WITHDRAW.MST; EVENT## (where ## is event 1 through 15); and PENALTY. [Note that not shown on the flow diagrams is the back-up back-up to previous screen, and/or special program escape function keys that facilitate the operator's ease of correcting errors. The "F" function keys are used. Messages are displayed on the last line of the screen. All are descriptive as to the function they perform.]

The main menu of the Squadding/Cashiering program is shown in FIG. 10. F10 will end the program execution. Referring to FIGS. 8A and 8B, note that selection of "A" or "B" from the menu will bring up a menu from which the operator must select if the input is to be by name or ATA number. The search is initiated by selection of either upon entering the appropriate information. If the ATA number option is selected, the program will only allow a 7 digit number. If the name is used, the search, and subsequent display, will be for all names with the same letter characters as entered by the operator. In general, the ATA number is used since it is unique and once found the search is ended. In either case, the search is of the NAME.ATA index file located on the master computer. This file, created by the handicap program, is a much smaller, more manageable, file and has much faster access to records than either the original PCMASTER file or the tournament ENTRY.MST file. All information needed for effecting the shooter's entry in any event is obtained from the NAME.ATA file. The cashier/squadding program will not allow a shooter to enter any event (paid or reserved) unless the shooter has been properly classified. This is intentional in order to prevent shooters from entering without being classified and thus making it extremely difficult for management to accurately declare winners, etc. If the name is input, the display will indicate it is unique only if an exact match of the characters entered is found. If the name is unique, then the entry process may continue. If not, the program returns an error message and reverts to the NAME.ATA NUMBER menu. After finding the shooter, the information from the NAME.ATA file is transferred to a temporary storage array in memory.

A screen requesting an event number is displayed. Note also, at this point in the program, a BLOCK or UNBLOCK bubble is shown as an input. If the operator had chosen "B" or "C" from the program menu, this is the point the program execution starts for these functions. The block is an important means and method of the present invention whereby the squadder can "hold" a squad/position in an event for a shooter and be assured that sometime later the squad/position will still be available for the shooter. It is different than a paid or reserved function in that a shooter's name is not required. It is a temporary indication typically used to hold an entire squad for a group of shooters wishing to shoot together. Since only one shooter at a time can be entered, such a scheme is necessary. Furthermore, as a security precaution, only the operator blocking the squad can unblock. This is accomplished by utilizing the cashier's name and teller's ID. Thus, this invention provides, embodied in the described blocking system, computer software means for temporarily restricting access to a such entrant list for a such squad of a such event to a particular such first computer workstation; and computer software means for assigning, at such particular first computer workstation, an additional entrant to a such temporarily-restricted entrant list; and computer software means for restoring such access to such entrant list for such squad of such event to any such first computer workstation.

After the event number is entered, the program automatically checks to see if the number is within the pre-programmed values of COMPUTRAP's set-up program. If acceptable, the program checks if the shooter had previously entered and subsequently withdrawn from this event. If acceptable, i.e. no withdrawal was made, a screen will appear asking if a prior reservation had been made. If a previous withdrawal was made from this event, the operator is asked if it is okay to continue (Yes or No). If No, then the program asks for another event number. If Yes, then the PRIOR RESERVATION screen will appear. Note: If the BLOCK or UNBLOCK functions are being executed, this screen is bypassed.

If no prior reservation was made, the program displays a screen showing the availability of squads and positions for the event. A typical screen for singles and doubles is shown as FIG. 11. FIG. 12 shows a typical HANDICAP screen. FIG. 13 shows the screen after an entry has been made, but not completed. The screen has been recalled to verify the entry. It may only be voided or continue. It is important to note the annotations on FIGS. 11, 12 and 13. The arrangement and display of the alphanumeric characters, as well as special characters, provide the operator with a visual means of immediately assessing the availability of a squad and position. The display is the key for the squadder/cashiers ability to accurately place the shooter in a squad/position of his/her choosing, and, in the case of a handicap event, at the proper safe handicap distance. Furthermore, this will be the only individual at that squad/position. FIG. 9 illustrates in greater detail how the screen displays are created.

Figure 14:
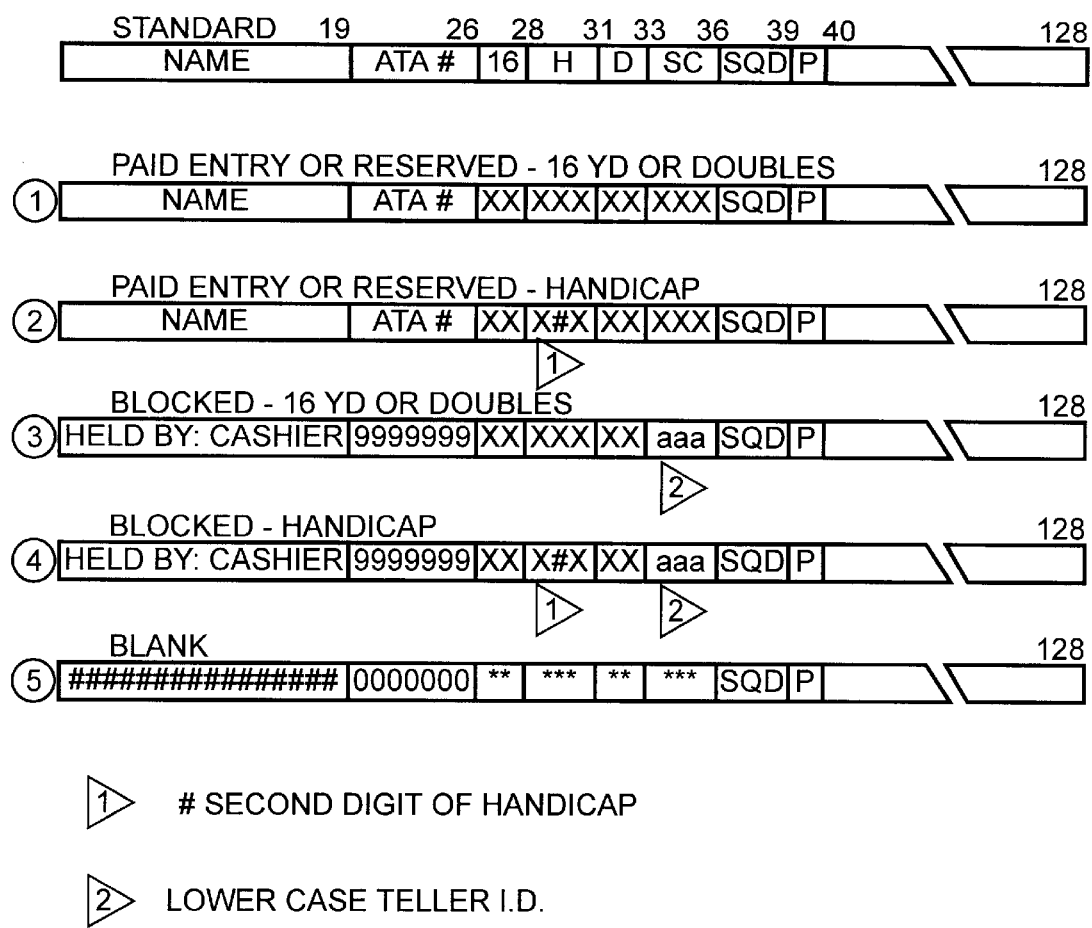
FIG. 14 illustrates preferred Temporary records fields for the event file.

To understand the screen format concept, it is first necessary to know the format of each of the EVENT files. The first 37 records of the event file are used for an index for each shooter's record. Record 38 stores the event number, type of event and number of targets in the event. Records 39 to the end of file are the individual shooter's records arranged in numerical order from the first squad first position to the last squad last (fifth) position. Unoccupied positions are blank. Occupied positions will have characters in accordance with one of the field arrangements illustrated in FIG. 14. Arrangement of the file in this manner allows synchronization of the index since each record number can be made to coincide with the squad and position by the formula: RECORD NUMBER=5(SQUAD NUMBER−1)+POSITION NUMBER−38.

This system creates an index within the EVENT file without changing the basic file structure (i.e. maximum field length of 128 characters). Location of the fields in the index records must be placed in exactly the same order as the order of the shooter's record. This is accomplished by knowing that only two characters of the classification or handicap of the shooter's record is needed for display. This embodies in the computer system of this invention computer storage means for storing an event data record for each such position of each such squad, each such event data record comprising fields for holding shooting data relevant to such event of such trapshooting competition, each such event data record being ordered according to successively numbered positions on successively numbered squads, and computer software means for providing indexing showing the location of each such event data record. It also embodies the step of, for each such event, using a computer, making a set of event records for storing event data for each such position of each such squad, each such event data record comprising fields for holding shooting data relevant to such event of such trapshooting competition, each such event data record being ordered according to successively numbered positions on successively numbered squads. Further, to be able to distinguish paid entries from/versus reserved entries, a third coded character is also needed. To distinguish squad blocking, lower case alpha characters representing the cashier's window identification are used. The upper case "X" is used to indicate that a position is being processed and is not available. As discussed, this system uses temporary codes in order to "lock out" another cashier from placing another shooter in the identical squad/position of an event. Since only a limited number of characters are used for the shooter's actual classification/handicap, it is easy to conclude that by placing different characters within the shooter's record, temporarily, a technique is provided whereby the cashiers/ squadders can quickly recognize the availability of open or not-open positions. Further, automatic status of paid or unpaid customers can be readily determined. This is accomplished with only three characters per field.

This technique and means of the present invention is necessary as availability of each squad/position is on a first-come basis. This makes it necessary to "lock in" the shooters choice as quickly as possible so that the subsequent determination of fees and options can be accomplished without loss of the position. In the case of a paid or reserved entry, the record is held and cannot be taken until the entry is either completed or canceled. In the case of a blocked squad/position, if the position is open, the placement of the "Held by :" information is immediately written to the disk and the program returns to ask for another BLOCK input request. (Note: Subsequent attempts by a paid entry to access reserved or blocked positions will produce an "OVERRIDE WARNING" message. If desired, the operator can continue the entry for that position. The program will not allow a paid position or a position with an "X" to be overridden.)

Upon completion of one event entry, the cashier has the option of entering the shooter in another event or ending the entry process. The data for each event is temporarily stored using program memory arrays. Deletion and/or corrections of the entry is provided by use of the function ("F") keys. On screen instructions are explicit. Upon completion of entry of all desired events, the totals are displayed to the cashier and upon satisfaction, the receipt is printed. Only at this time is the shooter's entry stored to the hard disk. Any subsequent changes must be made through the COMPUTRAP cashier's change program. Upon completion of the receipt printout, the program returns to the beginning and awaits the next ATA number. This point of entry is selected since probably (over 90% of the time) the ATA number is used for input. It is quicker, both for input and record search. If the NAME or ATA NUMBER menu or the main menu is needed, the operator will follow the on screen instructions.

After payment of entry fees, the shooter then may participate in the appropriate event, shooting when his or her squad is given permission. Upon completion of the event, the score sheets are checked for accuracy. The scores are then entered into COMPUTRAP's data bank through the keyboard of computer(s) S (see FIG. 1). If desired, the scores may be displayed on electronic monitor screens controlled by computers X and Y. After the scores of all the contestants in the event are entered, the data is processed for winners and any other information that the tournament program may require. After as completion of all the events, which may take several days, the data is compiled and formatted to the ATA requirements and sent to the ATA office in Vandalia, Ohio.

Referring to FIG. 15, a Handicap flow diagram, input to the handicap program is the shooter's ATA number. This number is a seven digit, unique number, assigned by the ATA office. It is similar to a credit card number. If the shooter does not have an ATA number (either forgot or is a new shooter and has yet not been assigned a number), an artificial number is assigned. The number must be seven digits beginning with "00". "00" is necessary because the ATA does not use "00" for a beginning number for any ATA numbers. The shooter's name is not used because names may be ambiguous and the PCMASTER file is provided in ATA number sort order. Computer time to search for names is prohibitive. The ATA number is entered through the keyboard either with a magnetic strip card reader or by hand. (Note: The ATA card has a magnetic strip with the ATA number.) After verifying that the ATA number is a seven digit number, COMPUTRAP's NAME.ATA file is checked for a prior entry. This is necessary to prevent multiple classifications under the same ATA number. If no prior entry is found, the number is searched for, zstarting with the previously compiled index files. If the number His found in the NAME.ATA file, the classification data is retrieved into memory and the search for the record in the PCMASTER file is initiated identically as if no prior entry was found. If the record is not found in the PCMASTER file, the redisplay is altered to reflect this. The search for the ATA number takes advantage of the format of the ATA's PCMASTER file (i.e., the ATA can supply the PCMASTER file in ascending number order). Further, the first two numbers is the year the number is issued. The remaining 5 digits begin with "00001". This allows 99,999 new members on a yearly basis.

Also, prior to about 1975, when the yearly technique of number assignment was instituted, the first two digits represented the state and province of Canada. This only required numbers up to the 60's. Therefore, when the switch was made to a yearly starting number, there was no incompatibility in the chronological numbers. COMPUTRAP takes advantage of this format to improve the speed of the ATA number search by creating two index files specifically keyed to the record number of the ATA PCMASTER file. As mentioned, these are INDEX.REC and INDEX.ATA. The index files are created with the COMPUTRAP utility program, selectable from 'U2' of the main menu. (Note: The PCMASTER file cannot be used unless the index program is run prior to using the handicap program.) Searching for the record in the ATA PCMASTER file starts by matching the first two numbers of the ATA number with the first two digits in the INDEX.REC file. Once the number is matched, the range of record numbers for the first two numbers of the ATA number in the PCMASTER file is returned. Then, using the starting and ending numbers as limits, the entire ATA number is searched in the INDEX.ATA file. When found, this points to the record number in the PCMASTER file. If the number is not found in either of the index files, the name, address and classification data must be inputted manually, if no prior entry has been made (FIG. 16 illustrates the format).

If the shooter is found in the PCMASTER file, the data is displayed to the screen. PCMASTER supplies the shooter's current number of targets shot at and broken for the current and prior two years, the current handicap yardage, life-time targets broken, and the current address. COMPUTRAP computes the averages and formats the screen display (see FIG. 18). The recommended classification is computed by comparing the shooter's average with a predetermined tournament classification for that average. The predetermined classification is established by the tournament program and is inputted and stored in the PROGRAM.TBL file. COMPUTRAP's handicap program loads this data when the program is started. The computer operator has the option of selecting COMPUTRAP's calculation or manually inputting the classification data.

If the classification is input manually, COMPUTRAP will only allow the letter/number combinations in accordance with the ATA classifications (i.e. sixteen yard and doubles events are AA, A, B, C, or D). Handicap is 19.0 to 27.0 in M-yard increments. The program will not allow an incorrect input. In either case, manual input or automatic, the special category must be input manually. If the shooter does not qualify for any of the special categories, the operator merely presses the <ENTER>key to by pass an entry. Again, the program will not allow any incorrect input. Special categories are: L for Ladies; V for Veterans; SV for Senior Veteran; LV for Lady Veteran; LSV for Lady Senior Veteran; SJ for Sub-junior; LSJ for Lady Sub-junior; J for Junior; LJ for Lady Junior; and I for Industry. If the tournament is a State Shoot, the operator will be asked to make an entry for a resident or non-resident shooter. This screen will not appear unless the tournament was declared a State Shoot when the tournament program was initially set up using COMPUTRAP's setup program. The data is stored in the NAME.ATA file's first record. The data is loaded into COMPUTRAP's handicap program when the program is executed. At this point, a final opportunity to change any data is presented to the operator. If the data is acceptable, upon the pressing of the keyboard <ENTER> key, the data is placed in the next available record in the ENTRY.MST file and the NAME.ATA file. All data not input, such as date and time entered, etc., are obtained from the computer's operating system. If data is unacceptable, the operator has the option of backing up one step at a time or canceling all inputs and starting over. Data is not recorded unless the final <ENTER>is pressed. Upon pressing the <ENTER>key, the program clears all variables, and returns to the INPUT ATA NUMBER and awaits the next ATA number. See FIG. 18 for fields of the these files.

It is noted that the NAME.ATA file is an index file for the cashiering programs. As mentioned, it is used to significantly speed the access to only the necessary information the cashiers programs need. Thus, it is necessary that the record numbers of the NAME.ATA file and the ENTRY.MST file be identical. This is insured by momentarily locking both files while the data is written to the master computer's hard disk. This technique allows more than one computer access to the files—either to enter new data or prior entered data—and be able to keep the records in order. This embodies in the computer system of this invention computer storage means for storing an ordered-name data file for showing the such events entered by each such entrant; and computer software means for temporarily restricting data-writing access to such ordered-name data file to a particular such first computer workstation until such data-writing is complete, whereby such data file may be efficiently maintained in order.

If the ATA number is found in the NAME.ATA file, the record data is searched for in the INDEX and PCMASTER files in the same manner as if no prior entry had been made. However, the displays are different in that the previous classification is displayed for the operator along with the data of the PCMASTER file. If there is no record in the PCMASTER file, only the previously manually entered data is displayed. See FIG. 18 for a sample screen display. The operator must select if a change is desired or, if none, the program will return to await the input of the next ATA number. If a change is necessary to one or more of the prior classifications, the operator must manually input the correct values. If no change is required only <ENTER> need be pressed. The procedure is similar to the process for manually inputting the original data described above. As previously, when the operator is satisfied with the changes, the new values are stored in the same record number as was the original data. The new overwrites the old data. In addition, the operator must provide an input as to which event the new classification is to be effective. This is necessary since the shooter may have entered one or more events subsequent to his/her original entry. Upon entering the correct starting event, the program automatically searches every event for the shooter and, if found, makes the changes in the shooter's record. When completed, the program returns for a new ATA number input.

It is noted that pressing function key F5 allows the operator to search the ENTRY.MST file for a shooter by name. This feature is sometimes handy when it is necessary to review a prior entrant's classification. The entire record is displayed on the screen. If insufficient letters are entered so that the name is not unique, then all records found beginning with the letters entered will be displayed. It is also noted that pressing function key F2 displays the total shooters classified.

For the program for inputting the scores from the field score sheets to the selected event file, the screen presentation is exactly as the shooter shot the event. Scores are input by the sub-events exactly in the order shot. Selection of squads, subevents, etc. is via the keyboard. On screen instructions are explicit. The key to accurate processing of winners, moneys, etc., is the accurate inputting of the scores. Since the scores are input by humans, who can err, it is always good to have a check system. It is best to read the inputted data back from the screen and compare it to the score sheet from whence the data came. The input is the event number; and then follow the onscreen instructions. Input of scores is made straightforward by displaying the entire squad of shooters in exactly the order as indicated on the field score sheets. Shoot management determines when a particular event is closed for additional entries. At this time a pre-printed form, the field score sheet with the shooters name and classification for each squad (5 shooters to a squad), must be "made out". The score sheets are then distributed to the particular trap(s) that the shooter is assigned to shoot his or her target. Prior to the shooter shooting the targets, a COMPUTRAP print program sorts and provides selectable printouts delineating the shooters squad/position and classification for "making out" the score sheets. The print-outs are in sequence by squad on either standard 8½"×11" or 3½ inch labels (selectable) or continuous tractor feed computer format. (Refer to PRINT OUT menu item.)

The only input required to start the program is the event number. The program looks for the appropriate event file and verifies that the event number entered is within the correct range for the tournament. Upon verification of the event number, a screen menu allows selection of "Inputting scores" or Displaying scores entered". The "display of scores" is a useful indication of the squads for which scores have been received and entered. At most tournaments, the completed score sheets come to the processing center in a non-sequential order. Thus, one can easily surmise that keeping track of non-returned score sheets can easily result in lost or unreported scores. Upon choosing "Inputting scores", the program automatically searches for and displays the first and last squad. The operator may choose any squad within this range. After selection of the initial starting squad, the program uses the tournament program file (PROGRAM.TBL) to determine if the event is a 100 or 200 target event. If the event is a 200 target event, the operator must choose if the scores being input are for the first 100 or second 100 targets. This is a one time selection for this session.

After verification of the squad, the program searches the event file on the hard drive for the squad selected. If the squad is empty (i.e., no shooters on the squad) the program will automatically look for the next highest occupied squad. The names and scores (if any were previously entered) of the entire squad is displayed on the screen. If it is only a partial squad, then only the shooters on the squad are displayed. Scores are entered through the keyboard for each trap. Cursor position for data entry of next shooter is automatic upon pressing the <ENTER> key. This is exactly as a normal 10-key adding machine. Scores entered for each shooter are stored in a temporary scores array. Only after the last score of the scoresheet is entered are the scores transferred from the temporary scores storage array to the shooters record on the computer hard drive. This technique minimizes network traffic thereby speeding up all COMPUTRAP program operations. When the last squad is completed, the program asks for a return to the menu. The program may be exited at any time. If one is in the scores inputting mode, the program will return to the menu select. The program then may be ended from this point.

The COMPUTRAP software package that controls the contestant's entry, scores entry, entry changes, print-outs, and processing consists of a number of independent executable program modules. Each program is designed to perform a specific function. Selection of a program is from a descriptive menu. The letter/number choices will load the executable programs. In all cases, the operator should follow the on screen instructions.

Selection of 'N' from COMPUTRAP's main menu (FIG. 24) will automatically load ALL the support files. Selection of any other letter will load those support files required to support the specific function. Since all of COMPUTRAP's programs are callable from the 'N' NORMAL key, only the 'N' menu will be discussed. For example, the cashiers/squadders menu is made up of various programs from the normal COMPUTRAP umbrella and placed in a menu specifically designed for the cashier. This technique allows easy customizing of COMPUTRAP for specific functions.

The 'N' NORMAL selection from the COMPUTRAP main menu provides four options. These are: CASHIER/SQUADDING; OPTIONS; PRINT; and UTILITY. FIG. 20 illustrates a preferred Compute Options Menu. FIG. 21 illustrates a preferred Print Menu. FIG. 22 illustrates a preferred Utility Menu. After choosing a particular function to be executed from the screen, one has only to follow the on screen instructions to execute the desired task. In most cases, simple yes 'Y' or no 'N' answers are required to the questions. Those questions asking for other types of inputs are clearly enunciated. A wrong answer is not allowed. A discussion of each menu item follows.

The cashier and squadding programs are the heart of the COMPUTRAP entry system, and these have been described hereinbefore. All the programs for the cashiers/squadders needs are selectable from the MENU of FIG. 10. The cashier has three entry options: "PAID ENTRY", "RESERVATIONS", or "BLOCK A SQUAD"; the fourth option is to "UN BLOCK A SQUAD". The first two selections require that the shooter be previously classified. As was noted, the BLOCK A SQUAD does not require shooter classification. It is primarily used to hold, i.e., block a squad/position, so that another cashier cannot take the position.

All selections require an event be specified which is then followed by a screen depicting the previous entries in the event. After completion of the entries requested by the contestant, which may take several minutes, the COMPUTRAP ENTRY program will total the amount to be paid (if the shooter is not making a reservation or blocking a squad). A final opportunity to correct or add any additional information is presented on screen. If all is correct, a receipt is printed on two part, no-carbon-required (ncr) paper, one copy for the shooter and one copy for the cashier. At this time the entry is complete. Any changes to the entry must be made using the COMPUTRAP CHANGE program, A2 from the menu. Changes to an entry can only be effected if an entry has been completed by the initial entry program. This program is used to make event withdrawals, change squads, change options and change fees payments. A change can only be made to one event at a time.

CHECK RESERVATIONS (A3) is a program to ascertain the reserved status for a shooter for all events for which he/she holds reservations. This program can only be used for viewing. An optional print out is available. VIEW SQUADS or FIND SQUAD/PERSON (A4) is a program that provides three on screen displays of a specified event:

1. Search by Squad—Displays three squads simultaneously.

Format is shooters squad/position, options, options played, classification, and scores. Screen can be changed to scroll through the entire event using the UP-DOWN keys.

2. Search by Name—Searches for and displays the shooter(s) name as originally entered. Display is same as 1. above.

3. Display all Squads—An overview identical to the presentation of Al—CASHIERING & RESERVATIONS.

CANCEL RESERVATIONS (A5) is a program that allows the cancellation of individual or ALL reservations made via A1—CASHIERING & RESERVATIONS. Once a cancellation is effected, the record cannot be restored. The program also cancels all previous entered BLOCKED SQUADS. CASHIERS CHECKOUT (A6) is a program that totals all the monetary transactions for a teller (cashier) for that date. The program is read only and may be executed any time. No input is required.

RE-PRINT RECEIPT (A7) is a program that searches for ALL entries in all events for a shooter. Input is the shooters ATA NUMBER or NAME. Output is a COPY RECEIPT. LOOK-UP CLASSIFICATION (A8) is a program that displays on screen or optionally prints the shooters classification/handicap. Input is the shooters ATA NUMBER or NAME.

There are many types of cashiering systems for distributing purses and options. The Compute Options menu provides a sample of five that are commonly used. Some knowledge in selection of the desired program is necessary. The tournament program, or the program manager, specifies the type of purse or option. All programs require as an input the event number and the number (1–7) of the purse or option to process. A number (1–6) is assigned to each purse or option. Number 7 is reserved for added money. Computations are rounded down to the nearest $0.50. Output is a print out of the number of winners and the amount of money for each winner. The results of computed options are placed in a CASH## file, where "##" is an event number, for use by various print programs. If, for any reason an error is made during the computation process of ANY option, or a score subsequently of changed AFTER the options have been computed, etc., it is wise to ERASE the affected CASH## file and re-compute the options again. The subsequent changes in scores may produce inaccurate payoffs. Use DOS ERASE or DOS DEL to delete the affected file. The command is: DEL F:ENTRYSCASH## <ENTER>where "##" is the event number (1–15).

With respect to the Print Options, all the print programs are formatted outputs from the data records. Some knowledge of the game is required in order to select the proper print out. EVENT (C1) is a program that provides for a selection of three types of print outs of a specified event:

1. With Scores—Scoreboard format. Is in squad/position order starting from lowest to highest as specified in the input. Prints shooters squad/position, name, options played, classification, and scores.
2. Without Scores—Similar to 1. above except that scores and options are not printed. Used for the line management.
3. Labels—Prints 1½ by 4 inch labels in squad/position order with shooters name and classification.

Placed on the score sheets on the trap field.

PAYOUT LIST (C2) is an alphabetical listing of the shooter's money winnings for a specified event. Each option for which the shooter has moneys coming is listed. If no money is won, the shooter is not listed. One or more of the programs in MENU P must be completed prior to this print out. All or only part of the listing may be selected for print out.

WINNERS/ADVANCEMENTS (C4) is a program that, by selection, prints the event trophy winners OR automatically advances and prints the class/handicap winners in all subsequent events entered. Selection is by "OPEN", "RESIDENT" or "NON-RESIDENT" from on screen menus. Input is the event number, number of places desired, and for handicap events yardage increments (if appropriate).

HIGH OVERALL/HIGH ALL-AROUND (C5) is a program that compiles and prints the winners for the high overall or high all-around events. Choice is selectable from an on screen menu. A detail scores listing or summary score listing is selectable. This program looks for totaled scores in a SCORES.MST file which is created by the program "TRANSFER SCORES", D1, from the UTILITY PROGRAMS menu, i.e., this program must be run prior to C5, HIGH OVERALL/HIGH ALL-AROUND. Input is the classes or special classes and number of places. Classes or special classes are input as AA, A, B, C, D, L, V, SV, J, SJ, I as desired.

EVENT SUMMARY (C7) is a program that prints the total moneys collected for an event. Sorted by targets, options, fees and other (such as penalty fees, etc.). It also prints those shooters who paid but did not shoot the event. Input is the event number. CALCUTTA (C8) is a program that sorts those shooters playing the "CALCUTTA" option number, places them in random order, and prints the name list for the auctioneer. The names are placed in a CALCUTTA.PRN file, which may be used in a spread sheet. Input is the event number and the option number. CHECK STUB (C9) is a program that prints the payoff checks from the CASH## files. Lists the check number, payee and amount, and total of all checks for the specified event number. Input is the event number and starting check number. All or part of the file can be printed, as selected.

ATA DATA DISK FILE (C10) is a program that prints the records of the file ATADATA. The ATADATA file is created from D3, "ATA DISK" of the UTILITY PROGRAMS menu (see FIG. 22). No input is required. WINNERS LISTING (C11) is a program that prints the winners' scores in descending order for a specified event. Input is the event number and the lowest score to be printed.

MAILING LIST (C12) is an alphabetical listing of all the entries. Format is single column suitable for $15/16$ inch by 3½ inch labels. No input is required. CARRY OVERS (C13) is a program that sorts and prints event carry over ties from selected events. The program only sorts 16 yard and doubles events. Input is beginning event number and subsequent event numbers.

FIG. 23 illustrates a preferred Trap Shoot Entry Menu. FIG. 24, as described earlier, illustrates a preferred Main Menu. FIG. 25 illustrates a preferred Search Selection Menu.

The programs selectable from the Utility Programs menu (FIG. 22) either create the working files for all other processing programs OR are the corrections and monitor programs for checking those working files. TRANSFER SCORES (D1) is a program that compiles and totals the scores for each shooter from each individual event file to a SCORES.MST file. This file is used for determining high over all/high all-around and the ATADATA file. These scores are what is reported to the ATA for inclusion in their data bank. No input is required. Transfer is automatic when the program is executed. CORRECTIONS (D2) is a program used to make corrections in a shooter's name, address, ATA number, and to correct scores in the SCORES.MST or ATADATA files and delete records in the EVENT files. It essentially is the catch all corrections program for all files EXCEPT cashier's corrections. The required correction is selected from a sub-menu screen within the program. Restoration of a deleted record from an event file is only possible by re-entry using the CASHIERING & RESERVATIONS program (A1).

ATA DISC (D3) is a program that creates the ATADATA file in the ATA required format. The ATADATA file can only have a maximum of twelve events. COMPUTRAP can handle up to fifteen events. If the tournament has more than twelve events, then more than one ATADATA file must be created, i.e., the tournament program must be split and two or more separate discs, each having the name ATADATA, but different events, must be created. While somewhat cumbersome, this can best be done by creating one file with the desired events. Then using DOS COPY, copy the ATADATA file to floppy disc. Save this ATADATA file by renaming it as ATADATA.1. The process is repeated for the remaining events, except that the second ATADATA file is copied to a second floppy disk. The saved file would be named ATADATA.2. If twelve or fewer events are to be formatted, only one ATADATA file will be created.

With respect to RESTORE CASHIERS INDEX (D4), occasionally the cashiers index file, NAME.ATA, has become corrupted. This file is a quick access file used exclusively by the cashiers entry programs of menu A. It resides on the master server's virtual disk and is created and updated by the HANDICAP program from the ENTRY.MST file. Since it is not desirable to recycle the master server just to restore the NAME.ATA index file, this program restores it without affecting any other files. No input is required. YARDAGE CHECK (D5) is used only on handicap events. It is a utility program to determine if the yardage separation between positions are two yards or less and no more than three yards difference on the squad. It must be run on subsequent handicap events since yardage increases due to winning a prior handicap is not automatically verified. Output is an on screen display of the offending squad, listing names and yardages of each squad member. Input is the event number. VIEW FINAL SCORES (D6) is a view only utility program for viewing a shooter's scores for all events. Format is a screen display. Input is the shooters ATA NUMBER or NAME. HANDICAP TABLE (D7) is a utility to display the earned yardage table and, if necessary, to change the tables to comply with the current earned yardage table. No input is required unless the table is to be changed.

The COMPUTRAP startup programs reside in the TRAP directory. The following directories are required by COMPUTRAP. Set up the directories by using the DOS Make Directory (MD) command: TRAP—Contains all of COMPUTRAP's program files; ENTRYS-Contains COMPUTRAP's data files; ATAFILES—Contains the ATA data file PCMASTER, plus index files used to access PCMASTER; TRAPTBL-Contains data tables for computation of options.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. In association with a trapshooting competition of the type wherein each entrant in each event is, at one of multiple squad-assignment stations, assigned to a squad of particular said entrants scheduled for shooting at a specific time and place, a computer system for assisting assignment of each said entrant to a position in one said squad, comprising:
   a. multiple first computer workstations each respectively situated at one said squad-assignment station;
   b. a local area network, including a central server, connected with each said first computer workstation;
   central computer storage means for storing event data linking each said squad of each said event to an entrant list of said particular entrants assigned to said squad;
   d. computer software means for, during a particular time, temporarily permitting access to one said entrant list of said particular entrants for any one said squad of any one said event to a user-selected one said first computer workstation while temporarily barring all other said first computer workstations from access to said entrant list of said particular entrants for said one squad of said one event in order to prevent overfilling of said one squad; and
   e. computer software means for assigning, at said particular first computer workstation, during said particular time, an additional entrant to one said entrant list of said particular entrants for said one squad of said one event.

2. A computer system according to claim 1 further comprising:
   computer storage means for storing event handicap data for a large list of potential said entrants to said trapshooting competition; and
   computer software means for assigning to each said entrant for each said event an event handicap from said handicap data.

3. A computer system according to claim 2 further comprising:
   a second computer workstation, connected to said local area network, situate at a handicap-assignment station; and
   computer software means for assigning, at said second computer workstation, to each said entrant for each said event an event handicap from said handicap data.

4. A computer system according to claim 1 further comprising:
   computer storage means for storing fee payment data of fees paid by each said entrant for each said event; and
   computer software means for assigning to each said entrant for each said event said fee payment data.

5. A computer system according to claim 1 further comprising:
   computer storage means for storing scoring data for each said entrant for each said event; and
   computer software means for assigning to each said entrant for each said event said scoring data.

6. A computer system according to claim 5 further comprising
   computer software means for providing scoreboard-type information to a scoreboard.

7. A computer system according to claim 5 further comprising
   computer software means for computing prize allocations among entrants in said trapshooting competition.

8. A computer system according to claim 1 further comprising
   computer software means for restoring said access to said entrant list for said squad of said event to any said first computer workstation.

9. A computer system according to claim 1 further comprising
   computer storage means for storing an event data record for each said position of each said squad, each said event data record comprising data fields for holding shooting data relevant to said event of said trapshooting competition;
   each said event data record being ordered according to successively numbered positions on successively numbered squads; and
   computer software means for providing indexing showing the location of each said event data record.

10. A computer system according to claim 1 further comprising
    computer storage means for storing an ordered-name data file for showing the said events entered by each said entrant; and
    computer software means for temporarily restricting data-writing access to said ordered-name data file to a particular said first computer workstation until said data-writing is complete, whereby said data file may be efficiently maintained in order.

11. A computer system according to claim 1 further comprising
    computer software means for enabling a computer operator at at least one said first computer workstation to back up one screen at a time for efficient error correction.

12. In association with a trapshooting competition of the type wherein each entrant in each event is, at one of multiple squad-assignment stations, assigned to one squad of particular said entrants scheduled for shooting at a specific time and place, a computer system for assisting assignment of each said entrant to a position in said one squad, comprising the steps of:
    a. for each said event, using a computer, making a set of event data records for storing event data for each said position of each said squad, each said event data record comprising data fields for holding shooting data relevant to said event of said trapshooting competition, each said event data record being ordered according to successively numbered positions on successively numbered squads;
    b. using one of a set of first computer workstations connected to a server in a local area network, temporarily restricting access to said event data records for a particular one of said squads of only one said event to a particular said first computer workstation; and c. using said particular first computer workstation, assigning an additional entrant to said temporarily-restricted particular one squad event data records in order to prevent overfilling of said particular one squad.

13. A computer system according to claim 12 further comprising the steps of:

storing in said computer system event handicap data for a large list of potential said entrants to the trapshooting competition; and computing in said computer system and assigning to each said entrant for each said event an event handicap from said handicap data.

14. A computer system according to claim 13 further comprising the step of:

using said particular first computer workstation, unblocking restricted access to said temporarily-restricted squad event data records, whereby any said first computer workstation may access said temporarily-restricted squad event data records.

15. A computer system according to claim 14 further comprising the step of using said particular first computer workstation, computing a fee due from an entrant and issuing a receipt for said fee due.

16. A computer system according to claim 15 further comprising the step of writing, to said event data records, scoring data for each said entrant to said event.

17. A computer system according to claim 16 further comprising the step of providing to a monitor of a second computer workstation scoring data in the form of a scoreboard-leaderboard.

18. In a computer system of the type wherein multiple computer workstations are linked in a local area network, and for use in association with a clay sporting competition of the type wherein each entrant in each event is assigned to a position on a squad of particular said entrants, computer means for assisting the running of said clay sporting competition comprising:

a. computer software means for making, for each said event, a set of event data records for storing event data for each said position of each said squad, each said event data record comprising data fields for holding shooting data relevant to said event of said clay sporting competition;

b. computer storage means for storing said set of event data records;

c. computer software means for reading data from and writing data to said event data records, including scoring data for each said entrant in each said event; and d. computer software means for temporarily restricting access to said event data records for a particular said squad of one said event to a particular said computer workstation in order to prevent overfilling of said particular squad.

19. Computer means according to claim 18 further comprising computer software means for computing a handicap for the entrant from data supplied for potential entrants by a large organization overseeing rules and regulations of said clay sporting competition; and computer software means for providing a storage record, for said large organization overseeing rules and regulations of said clay sporting competition, of final data from said clay sporting competition.

20. Computer means according to claim 19 further comprising computer software means for assigning, at said particular computer workstation, an additional entrant to said temporarily-restricted squad event records.

* * * * *